US007254597B2

(12) United States Patent
Moir et al.

(10) Patent No.: US 7,254,597 B2
(45) Date of Patent: Aug. 7, 2007

(54) LOCK-FREE IMPLEMENTATION OF DYNAMIC-SIZED SHARED DATA STRUCTURE

(75) Inventors: Mark S. Moir, Somerville, MA (US); Victor Luchangco, Arlington, MA (US); Maurice Herlihy, Brookline, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 346 days.

(21) Appl. No.: 10/340,154

(22) Filed: Jan. 10, 2003

(65) Prior Publication Data

US 2003/0182465 A1 Sep. 25, 2003

Related U.S. Application Data

(60) Provisional application No. 60/373,359, filed on Apr. 17, 2002, provisional application No. 60/347,773, filed on Jan. 11, 2002.

(51) Int. Cl.
*G06F 12/12* (2006.01)
(52) U.S. Cl. .......................... 707/206; 707/205; 710/56
(58) Field of Classification Search ................ 707/206, 707/203, 205; 710/56
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,319,778 A | 6/1994 | Catino | |

(Continued)

FOREIGN PATENT DOCUMENTS

EP       0 366 585       5/1990

(Continued)

OTHER PUBLICATIONS

M. P. Herlihy J. E. B. Moss, "Lock-Free Garbage Collection for Multiprocessors" IEEE Transactions on Parallel and Distributed Systems vol. 3, Issue 3 (May 1992) pp. 229-236 ISSN:1045-9219.*

(Continued)

*Primary Examiner*—Paul Rodriguez
*Assistant Examiner*—Luke Osborne
(74) *Attorney, Agent, or Firm*—Robert C. Kowert; Meyertons, Hood, Kivlin, Kowert & Goetzel, P.c.

(57) ABSTRACT

Solutions to a value recycling problem that we define herein facilitate implementations of computer programs that may execute as multithreaded computations in multiprocessor computers, as well as implementations of related shared data structures. Some exploitations of the techniques described herein allow non-blocking, shared data structures to be implemented using standard dynamic allocation mechanisms (such as malloc and free). A variety of solutions to the proposed value recycling problem may be implemented. A class of general solutions to value recycling is described in the context of an illustration we call the Repeat Offender Problem (ROP), including illustrative Application Program Interfaces (APIs) defined in terms of the ROP terminology. Furthermore, specific solutions, implementations and algorithm, including a Pass-The-Buck (PTB) implementation are also described. Solutions to the value recycling problem can be applied in a variety of ways to implement dynamic-sized data structures.

29 Claims, 4 Drawing Sheets

U.S. PATENT DOCUMENTS

| | | | |
|---|---|---|---|
| 5,428,761 | A | 6/1995 | Herlihy et al. |
| 6,047,295 | A * | 4/2000 | Endicott et al. ............ 707/206 |
| 6,128,710 | A | 10/2000 | Greenspan et al. |
| 6,144,965 | A | 11/2000 | Olivier |
| 6,178,423 | B1 * | 1/2001 | Douceur et al. ............... 707/9 |
| 6,360,219 | B1 | 3/2002 | Bretl et al. |
| 6,360,220 | B1 | 3/2002 | Forin |
| 6,366,932 | B1 * | 4/2002 | Christenson ............... 707/206 |
| 6,581,063 | B1 | 6/2003 | Kirkman |
| 6,615,216 | B1 | 9/2003 | Hu |
| 6,651,146 | B1 | 11/2003 | Srinivas et al. |
| 6,826,757 | B2 | 11/2004 | Steele, Jr. et al. |
| 6,848,033 | B2 | 1/2005 | Joseph |
| 2001/0047361 | A1 | 11/2001 | Martin et al. |
| 2003/0140085 | A1 | 7/2003 | Moir et al. |
| 2003/0174572 | A1 | 9/2003 | Moir et al. |
| 2003/0182462 | A1 | 9/2003 | Moir et al. |
| 2004/0015510 | A1 | 1/2004 | Moir et al. |
| 2004/0015642 | A1 | 1/2004 | Moir et al. |
| 2004/0034673 | A1 | 2/2004 | Moir et al. |
| 2004/0153687 | A1 | 8/2004 | Moir et al. |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |

OTHER PUBLICATIONS

Mark Moir,"Practical implementations of non-blocking synchronization primitives" Santa Barbara, California, United States pp. 219-228 1997 ISBN:0-89791-952-1.*

Agesen, Ole et al., "DCAS-Based Concurrent Deques", 12th Annual ACM Symposium on Parallel Algorithms and Architectures, Jul. 2000, 10 pages.

Arora, Nimar S. et al., "Thread Scheduling for Multiprogrammed Multiprocessors", 10th Annual ACM Symposium on Parallel Algorithms and Architectures, Jul. 1998, 12 pages.

Herlihy, Maurice et al., "Transactional Memory: Architectural Support for Lock-Free Data Structures", Annual International Symposium on Computer Architecture, May 1993, 12 pages.

Michael, Maged M. et al., "Non-Blocking Algorithms and Preemption-Safe Locking on Multiprogrammed Shared Memory Multiprocessors", Journal of Parallel and Distributed Computing, 51 (1), pp. 1-26, 1998.

Trieber, R, "Systems Programming: Coping with Parallelism", IBM Technical Report RJ5118, Apr. 23, 1986, 48 pages.

Valois, John D., "Lock-Free Linked Lists Using Compare-and-Swap", in Proceedings of the 14th Annual ACM Symposium on Principles of Distributed Computing, pp. 214-222, 1995.

U.S. Appl. No. 09/837,671, titled "Lock Free Reference Counting" filed Apr. 18, 2001, naming as inventors David L. Detlefs et al.

Herlihy, M.P., et al., "Linearizability: A Correctness Condition For Con-Current Objects," ACM Transactions On Programming Languages and Systems, 12(3):463-492, Jul. 1990.

Herlihy, M.P., "Wait-Free Synchronization," ACM Transactions On Programming Languages and Systems, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," Proceedings 13th IEEE International Conference on Distributed Computing Systems, pp. 264-273. IEEE Computer Society Press, Washington, D.C., 1993.

Herlihy, M., "A Methodology For Implementing Highly Concurrent Data Objects," ACM Transactions on Programming Languages and Systems, 15(5):745-770, Nov. 1993.

Attiya, Haglt, et al., "Are Wait-Free Algorithms Fast?" Journal of the ACM, 41(4):725-763, Jul. 1994.

Lamarca, A., "A performance evaluation of lock-free synchronization protocols," Proceedings of the 13th Annual ACM Symposium on Principles of Distributed Computing, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," Proceedings of the 15th Annual ACM Symposium on Principles of Distributed Computing, pp. 223-232, ACM Press, New York, NY, 1996.

Greenwald, M. B., et al., "The Synergy Between Non-Blocking Synchronization And Operating System Structure," Proceedings of the 2nd Symposium on Operating Systems Design and Implementation, pp. 123-136, Usenix Association, Berkeley, CA, 1996.

Afek, Y., et al., "Disentangling Multi-Object Operations," Proceedings of the 16th Annual ACM Symposium on Principles of Distributed Computing, pp. 111-120, Aug. 1997. Santa Barbara, CA.

Attiya, Hagit, et al., "Atomic Snapshots In O(n log n) Operations," SIAM Journal on Computing, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Detlefs, David L., et al., "Even Better DCAS-Based Concurrent Deques," Lecture Notes in Computer Science, vol. 1914, pp. 59-73, Springer-Verlag, Berlin, Germany, ISBN: 3-540-41143-7, 2000.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

Afek, Yehuda, "Wait-Free Made Fast," Proc. 27th Annual ACM Symposium on the Theory of Computing, pp. 538-547, ACM Press, New York, NY 1995.

Afek, Yehuda et al., "Long-Lived Renaming Made Adaptive," Proceedings of the 18th Annual ACM Symposium on Principles of Distributed Computing, pp. 91-103, ACM Press, New York, NY, 1999.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," IEEE Transactions on Parallel and Distributed Systems, vol. 10 , No. 12, pp. 1317-1332, 1999.

Attiya, Hagit et al., "An Adaptive Collect Algorithm with Applications," Distributed Computing, vol. 15, No. 2, pp. 87-96, Apr. 2002.

Barnes, G., "A Method for Implementing Lock-Free Shared Data Structures," Proceedings of the 5th ACM Symposium on Parallel Algorithms and Architectures, pp. 261-270, ACM Press, New York, NY 1993.

Farook, Mohammad et al., "Managing Long Linked Lists Using Lock Free Techniques" in High Performance Computing Systems and Applications, Chapter 37 (pp. 407-422), Kluwer Academic Publishers, Oct. 1998.

Herlihy, Maurice, "Dynamic-Sized Lockfree Data Structures," Sun Microsystems Technical Report SMLI TR-2002-112, Jun. 2002.

Herlihy, Maurice et al., "The Repeat Offender Problem: A Mechanism for Supporting Dynamic-Sized Lock-Free Data Structures," Sun Microsystems Technical Report SMLI TR-2002-112, Jun. 2002.

Herlihy, Maurice et al., "Obstruction-Free Synchronization: Double-Ended Queues as an Example," *Proceedings of the 23rd International Conference on Distributed Computing*, p. 522, IEEE Computer Society, Washington, D.C., 2003.

Luchangco, Victor et al., "Nonblocking k-compare-single-swap," *Proceedings of the 15th Annual ACM Symposium on Parallel Algorithms and Architectures*, pp. 314-323, ACM Press, New York, NY, 2003.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Moir, Mark et al., "Wait-Free Algorithms for Fast, Long-Lived Renaming," *Science of Computer Programming*, vol. 25, No. 1, pp. 1-39, Aug. 1995.

Moir, Mark, "Transparent Support for Wait-Free Transactions," *Proceedings of the 11th International Workshop on Distributed Algorithms*, pp. 305-319, Springer-Verlag, London, UK, 1997.

Moir, Mark, "Laziness Pays! Using Lazy Synchronization Mechanisms to Improve Non-Blocking Constructions," *Proc. 19th Annual ACM Symposium on Principles of Distributed Computing*, pp. 61-70, ACM Press, New York, NY, 2000.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," *IEEE Transactions on Computers*, vol. 43, No. 5, pp. 548-559, May 1994.

Saks, Michael et al., "Optimal Time Randomized Consensus—Making Resilient Algorithms Fast in Practice," *Proc. 2nd ACM SIAM Symposium on Discrete Algorithms*, pp. 351-362, Society for Industrial and Applied Mathematics, Philadelphia, PA, 1991.

Shann, Chien-Hua et al., "A Practical Nonblocking Queue Algorithm Using Compare-and Swap," *Proceedings of the Seventh International Conference on Parallel and Distributed Systems* p. 470, IEEE Computer Society, Washington, D.C., 2000.

Shavit, N., et al., "Elimination Trees and the Construction of Pools and Stacks," *Theory of Computing Systems*, vol. 30, pp. 645-670, 1997.

Shavit, N., et al., "Software Transactional Memory," *Distributed Computing*, vol. 10, No. 2, pp. 99-116, Feb. 1997.

Shavit, Nir, et al., "Combining Funnels: A new twist on an old tale . . . ," *Proceedings of the 17th Annual ACM Symposium on Principals of Distributed Computing*, pp. 61-70, ACM Press, New York, NY, 1998.

Shavit, Nir, et al., "Combining Funnels: A Dynamic Approach To Software Combining," *Journal of Parallel and Distributed Computing*, vol. 60, No. 11, pp. 1355-1387, Nov. 2000.

Stone, Janice M., "A simple and correct shared-queue algorithm using Compare-and-Swap," *Proceedings of the 1990 ACM/IEEE Conference on Supercomputing*, pp. 495-504, IEEE Computer Society, New York, NY, 1990.

Turek, John et al., "Locking Without Blocking: Making Lock Based Concurrent Data Structure Algorithms Nonblocking," *Proceedings of the Eleventh ACM SIGACT-SIGMOD-SIGART Symposium on Principles of Database Systems*, pp. 212-222, ACM Press, New York, NY, 1992.

\* cited by examiner

| actions | |
|---|---|
| Environment | ROP output |
| $HireInv_p()$ | $HireResp_p(g)$ |
| $FireInv_p(g)$ | $FireResp_p()$ |
| $PostInv_p(g,v)$ | $PostResp_p()$ |
| $LiberateInv_p(S)$ | $LiberateResp_p(S)$ |
| $Arrest(v)$ | | state variables

For each client $p \in P$:
 $pc_p$: {idle, hire, fire, post(g,v),
   injail(v), liberate} init idle
 $guards_p$: set of guards init empty
For each value $v \in V$:
 $status[v]$: {injail, escaping, free}
   init free
For each guard $g \in G$:
 $post[g]$ : $V$ init null;
 $trapping[g]$ : bool init false;
$numescaping$: int init 0 transitions

$HireInv_p()$
 Pre: $pc_p$ = idle
 Eff: $pc_p$ = hire $FireInv_p(g)$
 Pre: $pc_p$ = idle
  $g \in guards_p$
  $post[g]$ = null
 Eff: $pc_p$ = fire
  $guards_p = guards_p - \{g\}$ $PostInv_p(g, v)$
 Pre: $pc_p$ = idle
  $g \in guards_p$
 Eff: $pc_p$ = post$(g,v)$
  $post[g]$ = null
  $trapping[g]$ = false $LiberateInv_p(S)$
 Pre: $pc_p$ = idle
  for all $v \in S$,
   $v \neq$ null and $status[v]$ = injail
 Eff: $pc_p$ = liberate
  $numescaping = numescaping + |S|$
  for all $v \in S$, $status[v]$ = escaping $Arrest(v)$
 Pre: $status[v]$ = free
  $v \neq$ null
 Eff: $status[v]$ = injail
  for all $g$ such that $post[g] = v$,
   $trapping[g]$ = true $HireResp_p(g)$
 Pre: $pc_p$ = hire
  $g \in G$
  $g \notin \bigcup_q guards_q$
 Eff: $pc_p$ = idle
  $guards_p = guards_p \cup \{g\}$ $FireResp_p()$
 Pre: $pc_p$ = fire
 Eff: $pc_p$ = idle $PostResp_p()$
 Pre: for some $g, v$, $pc_p$ = post$(g,v)$
 Eff: $pc_p$ = idle
  $post[g]$ = $v$
  $trapping[g]$ = $(status[v]$ = injail$)$ $LiberateResp_p(S)$
 Pre: $pc_p$ = liberate
  for all $v \in S$,
   $status[v]$ = escaping
  and for all $g \in \bigcup_q guards_q$,
   $(post[g] \neq v$ or $\neg trapping[g])$
 Eff: $pc_p$ = idle
  $numescaping = numescaping - |S|$
  for all $v \in S$, $status[v]$ = free

FIG. 3

LOCK-FREE IMPLEMENTATION OF DYNAMIC-SIZED SHARED DATA STRUCTURE

CROSS-REFERENCE TO RELATED APPLICATION(S)

This application claims benefit under 35 U.S.C. §119(e) of U.S. Provisional Application No. 60/347,773, filed Jan. 11, 2002 and U.S. Provisional Application No. 60/373,359, filed Apr. 17, 2002, each of which is incorporated herein by reference. In addition, this application is related to commonly-owned, U.S. application Ser. No. 09/837,671, filed Apr. 18, 2001, now U.S. Pat. No. 6,993,770 which is incorporated herein by reference.

BACKGROUND

1. Field of the Invention

The present invention relates generally to coordination amongst execution sequences in a multiprocessor computer, and more particularly, to structures and techniques for facilitating implementations of concurrent data structures and/or programs.

2. Description of the Related Art

Management of dynamically allocated storage presents significant coordination challenges for multithreaded computations. One clear, but important, challenge is to avoid dereferencing pointers to storage that has been freed (typically by operation of another thread). Similarly, it is important to avoid modifying portions removed from a list by operation of another thread). These and other challenges are generally well recognized in the art.

A common coordination approach that addresses at least some of these challenges is to augment values in objects with version numbers or tags, and to access such values only through the use of Compare-And-Swap (CAS) instructions, such that if a CAS executes on an object after it has been deallocated, the value of the version number or tag will ensure that the CAS fails. See e.g., M. Michael & M. Scott, *Nonblocking Algorithms and Preemption-Safe Locking on Multiprogrammed Shared Memory Multiprocessors, Journal of Parallel and Distributed Computing*, 51(1):1-26, 1998. In such cases, the version number or tag is carried with the object through deallocation and reallocation, which is usually achieved through the use of explicit memory pools. Unfortunately, this approach has resulted in implementations that cannot free memory that is no longer required.

Valois proposed another approach, in which the memory allocator maintains reference counts for objects in order to determine when they can be freed. See J. Valois, *Lock-free Linked Lists Using Compare-and-Swap*, in *Proceedings of the 14th Annual ACM Symposium on Principles of Distributed Computing*, pages 214-22, 1995. Valois' approach allows the reference count of an object to be accessed even after the object has been released to the memory allocator. This behavior restricts what the memory allocator can do with released objects. For example, the released objects cannot be coalesced. Thus, the disadvantages of maintaining explicit memory pools are shared by Valois' approach. Furthermore, application designers sometimes need to switch between different memory allocation implementations for performance or other reasons. Valois' approach requires the memory allocator to support certain nonstandard functionality, and therefore precludes this possibility. Finally, the space overhead for per-object reference counts may be prohibitive. We have proposed another approach that does allow memory allocators to be interchanged, but depends on double compare-and-swap (DCAS), which is not widely supported. See e.g., commonly-owned, co-pending U.S. application Ser. No. 09/837,671, filed Apr. 18, 2001, entitled "Lock-Free Reference Counting," and naming David L. Detlefs, Paul A. Martin, Mark S. Moir and Guy L. Steele Jr. as inventors.

Interestingly, the work that may come closest to meeting the goal of providing support for explicit non-blocking memory management that depends only on standard hardware and system support predates the work discussed above by almost a decade. Treiber proposed a technique called obligation passing. See R. Treiber, *Systems Programming: Coping with Parallelism*, Technical Report RJ5118, IBM Almaden Research Center, 1986. The instance of this technique for which Treiber presents specific details is in the implementation of a lock-free linked list supporting search, insert, and delete operations. This implementation allows freed nodes to be returned to the memory allocator through standard interfaces and without requiring special functionality of the memory allocator. However, it employs a "use counter" such that memory is reclaimed only by the "last" thread to access the linked list in any period. As a result, this implementation can be prevented from ever recovering any memory by a failed thread (which defeats one of the main purposes of using lock-free implementations). Another disadvantage of this implementation is that the obligation passing code is bundled together with the linked-list maintenance code (all of which is presented in assembler code). Because it is not clear what aspects of the linked-list code the obligation passing code depends on, it is difficult to apply this technique to other situations.

SUMMARY

It has been discovered that solutions to a value recycling problem that we define herein facilitate implementations of computer programs that may execute as multithreaded computations in multiprocessor computers, as well as implementations of related shared data structures. Some exploitations of the techniques described herein allow non-blocking, shared data structures to be implemented using standard dynamic allocation mechanisms (such as malloc and free). Indeed, we present several exemplary realizations of dynamic-sized, non-blocking shared data structures that are not prevented from future memory reclamation by thread failures and which depend (in some implementations) only on widely-available hardware support for synchronization. Some exploitations of the techniques described herein allow non-blocking, indeed even lock-free or wait-free, implementations of dynamic storage allocation for shared data structures. Shared data structures that may benefit from the described techniques may themselves exhibit non-blocking, lock-free or wait-free properties, though need not in all implementations or modes of use. In some exploitations, our work provides a way to manage dynamically allocated memory in a non-blocking manner without depending on garbage collection. For example, techniques described herein may be exploited to manage dynamically allocated memory in a non-blocking manner in or for the implementation of a garbage collector itself.

A variety of solutions to the proposed value recycling problem may be implemented. A class of general solutions to value recycling is described in the context of an illustration we call the Repeat Offender Problem (ROP), including illustrative Application Program Interfaces (APIs) defined in terms of the ROP terminology. Furthermore, specific solutions, implementations and algorithm, including a Pass-The-Buck (PTB) implementation are described.

Solutions to the proposed value recycling problem can be applied in a variety of ways to implement dynamic-sized data structures. For example, specific solutions are illustrated in the context of particular shared data structures and algorithms, e.g., a lock-free FIFO queue for which we demonstrate true dynamic sizing. In some cases, data structure implementations may be directly coded in ways that exploit the value recycling techniques described herein. In others, a single-word lock-free reference counting (SLFRC) technique (which builds on value recycling solutions) may be employed to transform, in a straight-forward manner, many lock-free data structure implementations that assume garbage collection (i.e., which do not explicitly free memory) into dynamic-sized data structures.

In some embodiments in accordance with the present invention, a method of supporting dynamic-sizing in a lock-free implementation of a shared data structure is provided. The method includes, in a thread of a multithreaded computation, dereferencing a pointer read from the shared data structure after successfully posting a guard on a value that encodes the pointer and freeing storage referenced by the value only after storage referenced by the pointer is not in the shared data structure and no successfully posted guard thereon remains uncancelled. In general, storage qualified for deallocation may be freed or reused, depending on the exploitation. For example, in some variations, storage referenced by a deallocation qualified value may be returned to a storage pool for reuse and freed as desired. In some variations, storage referenced by a deallocation qualified value may be directly freed to an operating system or memory allocator. Synchronization constructs such as a Compare-and-Swap (CAS) operation, a Load-Linked/Store-Conditional (LL/SC) operation pair and/or transactional sequences (e.g., as mediated by hardware transactional memory) may be employed in various realizations.

BRIEF DESCRIPTION OF THE DRAWINGS

The present invention may be better understood, and its numerous objects, features, and advantages made apparent to those skilled in the art by referencing the accompanying drawings.

FIG. 3 presents an I/O automaton specifying an exemplary formulation of the Repeat Offender Problem (ROP). The I/O automaton specifies environment and ROP output actions as well as state variables and transitions, including pre-conditions and post-conditions for various actions.

The use of the same reference symbols in different drawings indicates similar or identical items.

DESCRIPTION OF THE PREFERRED EMBODIMENT(S)

Figure 1:
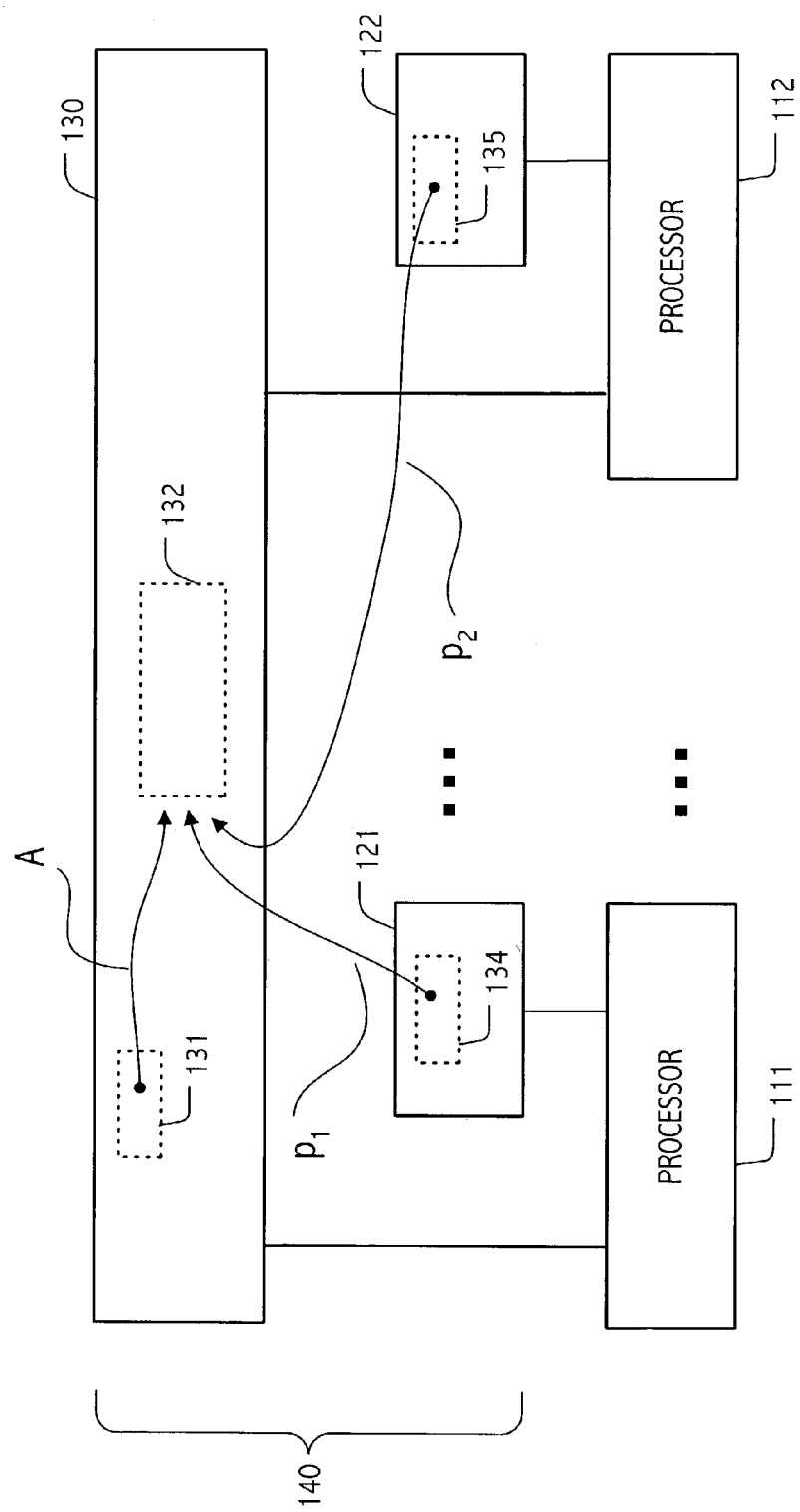
FIG. 1 is a depicts a shared memory multiprocessor configuration that serves as a useful illustrative environment for describing operation of some shared object implementations in accordance with the present invention.

A versatile mechanism has been developed for managing values shared amongst threads of a multithreaded computation. In some important exploitations, certain values so managed encode pointers to storage that is dynamically allocated, reused and/or freed in a computational system. Accordingly, techniques of the present invention provide a useful framework for supporting memory management in dynamic-sized data structures (i.e., those that can grow and shrink over time). Because some implementations of these techniques exhibit strong non-blocking properties (including, in some cases, wait-free properties), the techniques are particularly attractive for use in connection with non-blocking implementations of dynamic-sized, data structures. Indeed, a variety of applications to lock-free data structures are described herein.

However, while persons of ordinary skill in the art will recognize that the described techniques may be exploited in connection with data structures and/or algorithms that are non-blocking, indeed even lock-free or wait-free, based on the description herein, persons of ordinary skill in the art will also recognize that the described techniques may be exploited in connection with data structures and/or algorithms that are not necessarily non-blocking or for which not all modes of operation or use are non-blocking. Accordingly, descriptions herein made in the context of lock-free data structures are merely illustrative and provide a useful descriptive context in which the broader significance of the inventive techniques may be better appreciated.

As a result, descriptions of lock-free data structure exploitations should not be taken as limiting. Indeed, descriptions of exploitations in which managed values encode pointers should not be taken as limiting. As before, techniques for management of values that encode pointers simply provide useful descriptive context in which the broader significance of the inventive techniques may be better appreciated. Persons of ordinary skill in the art will appreciate, based on the description herein, that the inventive techniques are more generally applicable. In some exploitations, values so managed may include non-pointer values. For example, techniques of the present invention may be employed in the avoidance of ABA hazards. In some cases, avoided ABA hazards may involve non-pointer values. In others, avoided ABA hazards may involve pointer values and/or lock-free data structures. For example, one exploitation described herein illustrates use of the inventive techniques for avoidance of ABA hazards without version numbering commonly employed in the art.

Therefore, in view of the above, and without limitation, certain illustrative exploitations of the inventive techniques are described with particular attention to dynamic-sizing of lock-free data structures. Such illustrative exploitations should be viewed only as useful descriptive context, as the invention is defined solely by the claims that follow.

Dynamic-Sized Lock-Free Data Structures

In general, lock-free data structures avoid many of the problems associated with the use of locking, including convoying, susceptibility to failures and delays, and, in real-time systems, priority inversion. A lock-free implementation of a data structure provides that after a finite number of steps of any operation on the data structure, some operation completes. For reference, a wait-free implementation of a data structure provides that after a finite number of steps of any operation on the data structure, that operation completes. Both lock-free implementations and wait-free implementations fall within the broader class of non-blocking implementations, though wait-freedom is clearly the stronger nonblocking property. Both of the preceding definitions (i.e., lock-freedom and wait-freedom) tend to preclude the use of locks to protect the data structure, because a thread can take an unbounded number of steps without completing an operation if some other thread is delayed or fails while holding a lock the first thread requires.

Lock-free data structures present design challenges that are well recognized in the art and that highlight advantages of the inventive techniques, although such techniques are more broadly applicable to data structures and/or algorithms that are not necessarily nonblocking or which may exhibit stronger or weaker non-blocking properties. Therefore, without loss of generality, we focus illustratively on lock-free data structures.

In general, the difficulty of designing lock-free data structures is reflected in numerous papers in the literature describing clever and subtle algorithms for implementing relatively mundane data structures such as stacks, queues, and linked lists. There are a variety of reasons that dynamic-sized data structures are challenging to implement in a lock-free manner. For example, before freeing an object that is part of a dynamic-sized data structure (e.g., a node of a linked list), it is important to ensure that no thread will subsequently modify the object. Otherwise, a thread might corrupt an object allocated later that happens to reuse some of the memory used by the first object. Furthermore, in some systems, even read-only accesses of freed objects can be problematic: the operating system may remove the page containing the object from the thread's address space, causing the subsequent access to crash the program because the address is no longer valid. In general, the use of locks makes it relatively easy to ensure that freed objects are not subsequently accessed, because we can prevent access by other threads to the data structure (or parts thereof) while removing objects from it. In contrast, without locks, multiple operations may access the data structure concurrently, and a thread cannot determine whether other threads are already committed to accessing the object that it wishes to free. This is the root of one problem that our work aims to address.

Our techniques build on a problem specification that we call the Repeat Offender Problem (ROP). In some variations, the problem may be specified more generally in terms of value recycling. Solutions to the problem can be used to design dynamic-sized, lock-free data structures that can free memory to the operating system without placing special restrictions on the memory allocation mechanism. Most previous dynamic-sized lock-free data structure implementations do not allow memory resources used by the data structure to be reclaimed and reused for other purposes. ROP solutions are useful in achieving truly dynamic-sized lock-free data structures that can continue to reclaim memory even in the face of thread failures. Our solution is implementable in most modern shared memory multiprocessors.

FIG. 1 depicts a shared memory multiprocessor configuration in which techniques of the present invention may be employed. In particular, FIG. 1 depicts a pair of processors 111 and 112 that access storage 140. Storage 140 includes a shared storage portion 130 and local storage portions 121 and 122, respectively accessible by execution threads executing on processors 111 and 112. In general, the multiprocessor configuration is illustrative of a wide variety of physical implementations, including implementations in which the illustrated shared and local storage portions correspond to one or more underlying physical structures (e.g., memory, register or other storage), which may be shared, distributed or partially shared and partially distributed.

Accordingly, the illustration of FIG. 1 is meant to exemplify an architectural view of a multiprocessor configuration from the perspective of execution threads, rather than any particular physical implementation. Indeed, in some realizations, data structures encoded in shared storage portion 130 (or portions thereof) and local storage (e.g., portion 121 and/or 122) may reside in or on the same physical structures. Similarly, shared storage portion 130 need not correspond to a single physical structure. Instead, shared storage portion 130 may correspond to a collection of sub-portions each associated with a processor, wherein the multiprocessor configuration provides communication mechanisms (e.g., message passing facilities, bus protocols, etc.) to architecturally present the collection of sub-portions as shared storage. Furthermore, local storage portions 121 and 122 may correspond to one or more underlying physical structures including addressable memory, register, stack or other storage that are architecturally presented as local to a corresponding processor. Persons of ordinary skill in the art will appreciate a wide variety of suitable physical implementations whereby an architectural abstraction of shared memory is provided. Realizations in accordance with the present invention may employ any such suitable physical implementation.

In view of the foregoing and without limitation on the range of underlying physical implementations of the shared memory abstraction, operations on a shared object may be better understood as follows. Memory location 131 contains a pointer A that references an object 132 in shared memory. One or more pointers such as pointer A is (are) employed in a typical multithreaded computation. Local storage 134 encodes a pointer $p_1$ that references object 132 in shared memory. Local storage 135 also encodes a pointer $p_2$ that references object 132 in shared memory. In this regard, FIG. 1 illustrates a state, $*p_1 == *A$ && $*p_2 == *A$, consistent with successful completion of load-type operations that bring a copies of pointer value A into local storage of two threads of a multithreaded computation.

As a general matter, FIG. 1 sets up a situation in which operations of either thread may use (e.g. deference) their respective locally encoded value (e.g., pointer $p_1$ or $p_2$). Unfortunately, either thread may take action that recycles the value (e.g., qualifying, or freeing, object 132 for reuse) without coordination with the other thread. Absent coordination, operation of the multithreaded computation may be adversely affected. To see why this is so, and to explain our solution(s), we now turn to a simple data structure example.

SIMPLE EXAMPLE

A Lock-Free Stack

To illustrate the need for and use of techniques described herein, we consider a simple example: a lock-free integer stack implemented using the compare-and-swap (CAS) instruction. We first present a somewhat naive implementation, and then explain two problems with that implementation. We then show how to address these problems using value recycling techniques described herein. The following preliminaries apply to each of the algorithms presented.

Preliminaries

Our algorithms are presented in a C/C++-like pseudocode style, and should be self-explanatory. For convenience, we assume a shared-memory multiprocessor with sequentially consistent memory. We further assume that the multiprocessor supports a compare-and-swap (CAS) instruction that accepts three parameters: an address, an expected value, and a new value. The CAS instruction atomically compares the contents of the address to the expected value, and, if they are equal, stores the new value at the address and returns TRUE. If the comparison fails, no changes are made to memory, and the CAS instruction returns FALSE.

Suitable modifications for other programming styles, other memory consistency modes, other multiprocessor architectures and other synchronization facilities provided by other instruction sets and/or memory architectures/interfaces, are straightforward. Based on the specific examples presented herein, persons of ordinary skill in the art will appreciate a variety of such suitable modifications.

A Somewhat Naive Implementation and Its Pitfalls

A straightforward implementation approach for our lock-free integer stack is to represent the stack as a linked list of nodes, with a shared pointer—call it TOS—that points to the node at the top of the stack. In this approach, pushing a new value involves allocating a new node, initializing it with the value to be pushed and the current top of stack, and using CAS to atomically change TOS to point to the new node (retrying if the CAS fails due to concurrent operations succeeding). Popping is similarly simple: we use CAS to atomically change TOS to point to the second node in the list (again retrying if the CAS fails), and retrieve the popped value from the removed node. Unless we have GC to reclaim the removed node, we must explicitly free it to avoid a memory leak. Code for this (incorrect) approach follows:

```
struct nodeT {int val; nodeT *next;}
shared variable nodeT *TOS initially NULL;
Push(int v) {
1:    nodeT *oldtos, *newnode = malloc(sizeof(nodeT));
2:    newnode->val = v;
3:    do {
4:         oldtos = *TOS;
5:         newnode->next = oldtos;
6:    } while (!CAS(TOS,oldtos,newnode));
}
int Pop() {
7:    nodeT *oldtos, *newtos;
8:    do {
9:         oldtos = *TOS;
10:        if (oldtos == NULL) return "empty";
11:        newtos = oldtos->next;
12:    } while (!CAS(TOS,oldtos,newtos));
13:    int val = oldtos->val;
14:    free(oldtos);
15:    return val;
}
```

The first problem with the preceding stack implementation is that it allows a thread to access a freed node. To see why, observe that a thread p executing the Pop code at line 11 accesses the node it previously observed (at line 9) to be at the top of the stack. However, if another thread q executes the entire Pop operation between the times p executes lines 9 and 11, then it will free that node (line 14) and p will access a freed node.

The second problem is more subtle. This problem is widely known as the ABA problem, because it involves a variable changing from one value (A) to another (B), and subsequently back to the original value (A). The problem is that CAS does not distinguish between this situation and the one in which the variable does not change at all. The ABA problem manifests itself in the preceding stack implementation as follows. Suppose the stack currently contains nodes 1 and 2 (with node 1 being at the top of the stack). Further suppose that thread p, executing a Pop operation reads a pointer to node 1 from TOS at line 9, and then reads a pointer from node 1 to node 2 at line 11, and prepares to use CAS to atomically change TOS from pointing to node 1 to pointing to node 2. Now, let us suspend thread p for a moment. In the meantime, thread q executes the following sequence of operations: First q executes an entire Pop operation, removing and freeing node 1. Next, q executes another Pop operation, and similarly removes and deletes node 2. Now the stack is empty. Next q pushes a new value onto the stack, allocating node 3 for this purpose. Finally, q pushes yet another value onto the stack, and in this last operation, happens to allocate node 1 again (observe that node 1 was previously freed, so this is possible). Now, TOS points to node 1, which points to node 3. At this point, p resumes execution and executes its CAS, which succeeds in changing TOS from pointing to node 1 to pointing to node 2. This is incorrect, as node 2 has been freed (and may have subsequently been reallocated and reused for a different purpose). Further, note that node 3 has been lost from the stack. The root of the problem is that p's CAS did not detect that TOS had changed from pointing to node 1 and later changed so that it was again pointing to node 1. This is the dreaded ABA problem. Although values A and B encode pointers in the preceding example, the ABA problem may affect non-pointer values as well.

Our Mechanisms: PostGuard and Liberate

We provide mechanisms that allow us to efficiently overcome both of the problems described above without relying on GC. Proper use of these mechanisms allows programmers to prevent memory from being freed while it might be accessed by some thread. In this subsection, we describe how these mechanisms should be used, and illustrate such use for the stack example.

The basic idea is that before dereferencing a pointer, a thread guards the pointer, and before freeing memory, a thread checks whether a pointer to the memory is guarded. For these purposes, we provide two functions, PostGuard (ptr) and Liberate (ptr). PostGuard takes as an argument a pointer to be guarded. Liberate takes as an argument a pointer to be checked and returns a (possibly empty) set of pointers that it has determined are safe to free (at which time these pointers are said to be liberated). Thus, whenever a thread wants to free memory, instead of immediately invoking free, it passes the pointer to Liberate, and then invokes free on each pointer in the set returned by Liberate.

The most challenging aspect of using our mechanisms is that simply guarding a pointer is not sufficient to ensure that it is safe to dereference that pointer. The reason is that another thread might liberate and free a pointer after some thread has decided to guard that pointer, but before it actually does so. As explained in more detail below, Liberate never returns a pointer that is not safe to free, provided the programmer guarantees the following property:

At the moment that a pointer is passed to Liberate, any thread that might dereference this instance of the pointer has already guarded it, and will keep the pointer guarded until after any such dereferencing.

Note that a particular pointer can be repeatedly allocated and freed, resulting in multiple instances of that pointer. Thus, this property refers to threads that might dereference a pointer before that same pointer is subsequently allocated again.

If a thread posts a guard on a pointer, and subsequently determines that the pointer has not been passed to Liberate since it was last allocated, then we say that the guard traps the pointer until the guard is subsequently posted on another pointer, or removed from this pointer. We have found this terminology useful in talking about algorithms that use our mechanisms. It is easy to see that the programmer can provide the guarantee stated above by ensuring that the algorithm never dereferences a pointer that is not trapped.

We have found that the following simple and intuitive pattern is often useful for achieving the required guarantee. First, a thread passes a pointer to Liberate only after it has determined that the memory block to which it points is no longer in the shared data structure. Given this, whenever a thread reads a pointer from the data structure in order to dereference it, it posts a guard on that pointer, and then attempts to determine that the memory block is still in the data structure. If it is, then the pointer has not yet been passed to Liberate and so it is safe to dereference the pointer; if not the thread retries. Determining whether a block is still in the data structure is sometimes as simple as rereading the pointer (for example, in the stack example presented next, we reread TOS to ensure that the pointer is the same as the one we guarded; see lines 9c and 9d in the exemplary code below.)

Using Our Mechanisms to Fix the Naive Stack Algorithm

In the exemplary code that follows, we present stack code modified to make the required guarantee.

```
struct nodeT {int val; nodeT *next;}
shared variable nodeT *TOS initially NULL;
Push(int v) {
1:    nodeT *oldtos, *newnode = malloc(sizeof(nodeT));
2:    newnode->val = v;
3:    do {
4:        oldtos = *TOS;
5:        newnode->next = oldtos;
6:    } while (!CAS(TOS,oldtos,newnode));
}
int Pop() {
7:    nodeT *oldtos, *newtos;
8:    do {
9a:       do {
9b:           oldtos = *TOS;
9c:           PostGuard(oldtos);
9d:       } while (*TOS != oldtos);
10:       if (oldtos == NULL) return "empty";
11:       newtos = oldtos->next;
12:   } while ( !CAS(TOS,oldtos,newtos));
13:   int val = oldtos->val;
14a:  PostGuard(NULL);
14b:  for (nodeT *n in Liberate(oldtos))
14c:      free(n);
15:   return val;
}
```

To see how the modified code makes this guarantee, suppose that a thread p passes a pointer to node 1 to Liberate (line 14b) at time t. Prior to t, p changed TOS to a node other than node 1 or to NULL (line 12), and thereafter, until node 1 is liberated, freed and reallocated, TOS does not point to node 1. Suppose that after time t, another thread q dereferences (at line 11 or line 13) that instance of a pointer to node 1. When q last executes line 9d, at time t', prior to dereferencing the pointer to node 1, q sees TOS pointing to node 1. Therefore, t' must have preceded t. Prior to t', q guarded its pointer to node 1 (line 9c), and keeps guarding that pointer until after it dereferences it, as required. Note that the pointer is guarded until q executes line 14a (which stands down the guard) or line 9c (which effectively reassigns the guard to another post).

Guarantees of PostGuard and Liberate

While the above descriptions are sufficient to allow a programmer to correctly apply our mechanisms to achieve dynamic-sized data structures, it may be useful to understand in more detail the guarantees that are provided by the Liberate function. Below we describe those guarantees, and argue that they are sufficient, when they are used properly as described above, to prevent freed pointers from being dereferenced.

We say that a pointer begins escaping when Liberate is invoked with that pointer. Every liberated pointer—that is, every pointer in the set returned by a Liberate invocation—is guaranteed to have the following properties:

It previously began escaping.
It has not been liberated (by any Liberate invocation) since it most recently began escaping.
It has not been guarded continuously by any thread since it most recently began escaping.

If pointers are only freed after they are returned by Liberate, the first two conditions guarantee that every instance of a pointer is freed at most once. They are sufficient for this purpose because threads only pass pointers to Liberate when they would have, in the straightforward (but defective) code, freed the pointers, and threads free only those pointers returned by Liberate invocations.

The last condition guarantees that a pointer is not liberated while it might still be dereferenced. To see that this last condition is sufficient, recall that the programmer must guarantee that any pointer passed to Liberate at time t will be dereferenced only by threads that already guarded the pointer at time t and will keep the pointer guarded continuously until after such dereferencing. The last condition prevents the pointer from being liberated while any such thread exists.

Representative Application Programming Interface (API)

In this section, we present an application programming interface (API) for the guarding and liberating mechanisms illustrated in the previous section. This API is more general than the one used in the previous section. In particular, it allows threads to guard multiple pointers simultaneously.

Our API uses an explicit notion of guards, which are posted on pointers. In this API, a thread invokes PostGuard with both the pointer to be guarded and the guard to post on the pointer. We represent a guard by an int. A thread can guard multiple pointers by posting different guards on each pointer. A thread may hire or fire guards dynamically, according to the number of pointers it needs to guard simultaneously, using the HireGuard and FireGuard functions. We generalize Liberate to take a set of pointers as its argument, so that many pointers can passed to Liberate in a single invocation. The signatures of all these functions are shown below.

```
typedef guard int;
typedef ptr_t (void *);
void PostGuard(guard g, ptr_t p);
guard HireGuard();
void FireGuard(guard g);
set[ptr_t] Liberate(set[ptr_t] S);
```

Below we examine each function in more detail.

Detailed Function Descriptions void PostGuard(guard g, ptr_t p)
    Purpose: Posts a guard on a pointer.
    Parameters: The guard g and the pointer p; g must have been hired and not subsequently fired by the thread invoking this function.
    Return value: None.
    Remarks: If p is NULL then g is not posted on any pointer after this function returns. If p is not NULL, then g is posted on p from the time this function returns until the next invocation of -continued

| | PostGuard with the guard g. |
|---|---|
| guard HireGuard() | |
| Purpose: | "Acquire" a new guard. |
| Parameters: | None. |
| Return value: | A guard. |
| Remarks: | The guard returned is hired when it is returned. When a guard is hired, either it has not been hired before, or it has been fired since it was last hired. |
| void FireGuard(guard g) | |
| Purpose: | "Release" a guard. |
| Parameters: | The guard g to be fired; g must have been hired and not subsequently fired by the thread invoking this function. |
| Return value: | None. |
| Remarks: | g is fired when FireGuard (g) is invoked. |
| set[ptr_t] Liberate(set[ptr_t] S) | |
| Purpose: | Prepare pointers to be freed. |
| Parameters: | A set of pointers to liberate. Every pointer in this set must either never have begun escaping or must have been liberated since it most recently began escaping. That is, no pointer was in any set passed to a previous Liberate invocation since it was most recently in the set returned by some Liberate operation. |
| Return value: | A set of liberated pointers. |
| Remarks: | The pointers in the set S begin escaping when Liberate (S) is invoked. The pointers in the set returned are liberated when the function returns. Each liberated pointer must have been contained in the set passed to some invocation of Liberate, and not in the set returned by any Liberate operation after that invocation. Furthermore, Liberate guarantees for each pointer that it returns that no guard has been posted continuously on the pointer since it was most recently passed to some Liberate operation. |

Comments on API Design

We could have rolled the functionality of hiring and firing guards into the PostGuard operation. Instead, we kept this functionality separate to allow implementations to make PostGuard, the most common operation, as efficient as possible. This separation allows the implementation more flexibility in managing resources associated with guards because the cost of hiring and firing guards can be amortized over many PostGuard operations.

In some applications, it may be desirable to be able to quickly "mark" a value for liberation, without doing any of the work of liberating the value. Consider, for example, an interactive system in which user threads should not execute relatively high-overhead "administrative" work such as liberating values, but additional processor(s) may be available to perform such work. In such a case, it may be desirable to provide two (or more) versions of Liberate, where a quick version simply hands off all the values it is passed and returns the empty set.

Finally, our terminology is somewhat arbitrary here. In general, the relevant concepts may be expressed differently (or more generally) in other implementations. For example, rather than posting a guard on a value, a given implementation may be described in terms of an Announce operation that announces an intention to use the value. Similarly, functionality corresponding to that of guards may be provided using "handles" or other facilities for making such announcements. Liberating constructs may be implemented or represented in terms of a "cleaner" operation and related states. In short, many variations may be made without departing from central aspects of our inventive techniques.

The Repeat Offender Problem

We now more formally define a Repeat Offender Problem (ROP), which captures some important properties of the support mechanisms for nonblocking memory management described herein. ROP is defined with respect to a set of values, a set of application clients, and a set of guards. Each value may be free, injail, or escaping; initially, all values are free. An application-dependent external Arrest action can cause a free value to become in ail at any time. A client can help injail values to begin escaping, which causes them to become escaping. Values that are escaping can finish escaping and become free again.

Clients can use values, but must never use a value that is free. A client can attempt to prevent a value v from escaping while it is being used by "posting a guard" on v. However, if the guard is posted too late, it may fail to prevent v from escaping. Thus, to safely use v, a client must ensure that v is injail at some time after it posted a guard on v. Clients can hire and fire guards dynamically, according to their need.

ROP solutions can be used by threads (clients) to avoid dereferencing (using) a pointer (value) to an object that has been freed. In this context, an injail pointer is one that has been allocated (arrested) since it was last freed, and can therefore be used.

Figure 2:
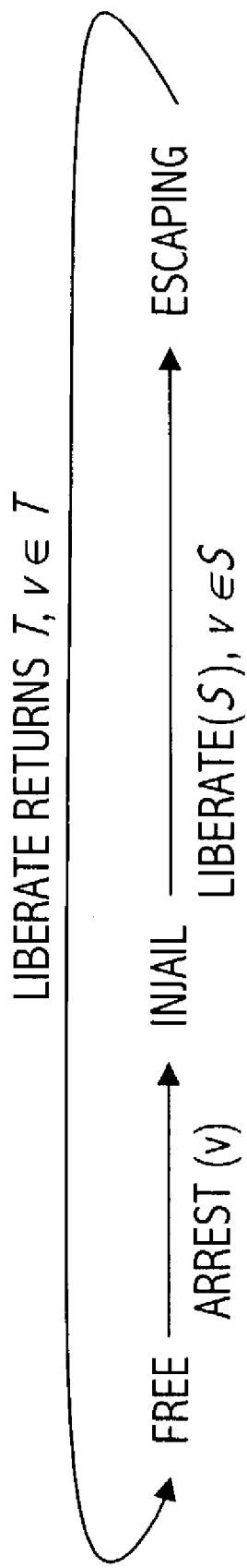
FIG. 2 illustrates transitions for a value v in accordance with one Repeat Offender Problem (ROP) formulation of value recycling.

ROP solutions provide the following procedures: A client hires a guard by invoking HireGuard( ), and it fires a guard g that it employs by invoking FireGuard (g). A ROP solution ensures that a guard is never simultaneously employed by multiple clients. A client posts a guard g on a value v by invoking PostGuard (g, v); this removes the guard from any value it previously guarded. In the implementation illustrated, a special null value is used to remove the guard from the previously guarded value without posting the guard on a new value. A client may not post (or remove) a guard that it does not currently employ. A client helps a set of values S to begin escaping by invoking Liberate (S); the application must ensure that each value in S is injail before this call, and the call causes each value to become escaping. The Liberate procedure returns a (possibly different) set of escaping values causing them to be liberated; each of these values becomes free on the return of this procedure. These transitions are summarized in FIG. 2. A ROP solution does not implement the functionality of the Arrest action—this is application-specific, but the ROP specification models arrests in order to know when a free value becomes injail.

If a guard g is posted on a value v, and v is injail at some time t after g is posted on v and before g is subsequently removed or reposted on a different value, then we say that g traps v from time t until g is removed or reposted. Of course, subsequent removal or reposting is not a requirement for trapping. Accordingly, if g is never removed or reposted g traps v at a time t and all later times. The operational specification of the main correctness condition for ROP is that it does not allow a value to escape (i.e., become free) while it is trapped.

A precise formulation of ROP is given by the I/O automaton shown in FIG. 3, explained below. Of course, any of a variety of implementations in accordance with the I/O automaton are suitable. We begin by adopting some notational conventions.

Notational Conventions: Unless otherwise specified, p and q denote clients (threads) from P, the set of all clients (threads); g denotes a guard from G, the set of all guards; v denotes a value from V, the set of all values, and S and T denote sets of values (i.e., subsets of V). We assume that V contains a special null value that is never used, arrested, or passed to liberate.

The automaton consists of a set of environment actions and a set of ROP output actions. Each action consists of a precondition for performing the action and the effect on state variables of performing the action. Most environment actions are invocations of ROP operations, and are paired with corresponding ROP output actions that represent the system's response to the invocations. In particular, the $PostInv_p(g, v)$ action models client p invoking PostGuard (g, v), and the $PostResp_p(\ )$ action models the completion of this procedure. The $HireInv_p(\ )$ action models client p invoking HireGuard( ), and the corresponding $HireResp_p(g)$ action models the system assigning guard g to p. The $FireInv_p(g)$ action models client p calling FireGuard(g), and the $FireResp_p(\ )$ action models the completion of this procedure. The $LiberateInv_p(S)$ action models client p calling Liberate (S) to help the values in S start escaping, and the $LiberateResp_p(T)$ action models the completion of this procedure with a set of values T that have finished escaping. Finally, the Arrest (v) action models the environment arresting value v.

The state variable status[v] records the current status of value v, which can be free, injail, or escaping. Transitions between the status values are caused by calls to and returns from ROP procedures, as well as by the application-specific Arrest action, as described above. The post variable maps each guard to the value (if any) it currently guards. The $pc_p$ variable models control flow of client p, for example ensuring that p does not invoke a procedure before the previous invocation completes; $pc_p$ also encodes parameters passed to the corresponding procedures in some cases. The $guards_p$ variable represents the set of guards currently employed by client p. The numescaping variable is an auxiliary variable used to specify nontriviality properties, as discussed later. Finally, trapping maps each guard g to a boolean value that is true iff g has been posted on some value v, and has not subsequently been reposted (or removed), and at some point since the guard was posted on v, v has been injail (i.e., it captures the notion of guard g trapping the value on which it has been posted). This is used by the LiberateResp action to determine whether v can be returned. Recall that a value should not be returned if it is trapped.

Preconditions on the invocation actions specify assumptions about the circumstances under which the application invokes the corresponding ROP procedures. Most of these preconditions are mundane well-formedness conditions, such as the requirement that a client posts only guards that it currently employs. The precondition for LiberateInv captures the assumption that the application passes only injail values to Liberate, and the precondition for the Arrest action captures the assumption that only free values are arrested. In general, a determination of how these guarantees are made is a matter of design choice.

Preconditions on the response actions specify the circumstances under which the ROP procedures can return. Again, most of these preconditions are quite mundane and straightforward. The interesting case is the precondition of LiberateResp, which states that Liberate can return a value only if it has been passed to (some invocation of) Liberate, it has not subsequently been returned by (any invocation of) Liberate, and no guard g has been continually guarding the value since the last time it was injail. Recall that this is captured by trapping[g].

Desirable Properties

As specified so far, an ROP solution in which Liberate always returns the empty set, or simply does not terminate, is correct. Clearly, in the context motivating our work, such solutions are unacceptable because each escaping value represents a resource that will be reclaimed only when the value is liberated (returned by some invocation of Liberate). One might be tempted to specify that every value passed to a Liberate operation is eventually returned by some Liberate operation. However, without special operating system support, it is generally not possible to guarantee such a strong property in the face of failing threads. We do not specify here a particular nontriviality condition, as we do not want to unduly limit the range of solutions. Instead, we discuss some properties that might be useful in specifying nontriviality properties for proposed solutions.

The state variable numescaping counts the number of values that are currently escaping (i.e., that have been passed to some invocation of Liberate and have not subsequently been returned from any invocation of Liberate). If we require a solution to ensure that numescaping is bounded by some function of application-specific quantities, we exclude the trivial solution in which Liberate always returns the empty set. However, because this bound necessarily depends on the number of concurrent Liberate operations, and the number of values each Liberate operation is invoked with, it does not exclude the solution in which Liberate never returns.

A combination of a boundedness requirement and some form of progress requirement on Liberate operations seems to be the most appropriate way to specify the nontriviality requirement. Recall that we have defined a general value recycling problem in terms of Repeat Offender style terminology (e.g., posting guards, liberation and states such as injail and escaping) and that we expect a variety of implementations and algorithms to solve that general problem. One such implementation includes the Pass The Buck (PTB) algorithm (detailed below), which for simplicity of description is also presented in Repeat Offender style terminology. Turning to the PTB algorithm, we can establish that PTB provides a bound on numescaping that depends on the number of concurrent Liberate operations. Because the bound (necessarily) depends on the number of concurrent Liberate operations, if an unbounded number of threads fail while executing Liberate, then an unbounded number of values can be escaping. We emphasize, however, that our implementation does not allow failed threads to prevent values from being freed in the future. This property is an important advantage over Treiber's approach (referenced above).

Our Pass The Buck algorithm has two other desirable properties: First, the Liberate operation is wait-free (that is, it completes after a bounded number of steps, regardless of the timing behavior of other threads). Thus, we can calculate an upper bound on the amount of time Liberate will take to execute, which is useful in determining how to schedule Liberate work. Finally, our algorithm has a property we call value progress. Roughly, this property guarantees that a value does not remain escaping forever provided Liberate is invoked "enough" times (unless a thread fails while the value is escaping).

Dynamic-Sized Lock-Free Queues

In this section, we present two dynamic-sized lock-free queue implementations based on a widely used lock-free queue algorithm previously described by Michael and Scott. See M. Michael & M. Scott, *Nonblocking Algorithms and Preemption-Safe Locking on Multiprogrammed Shared Memory Multiprocessors, Journal or Parallel and Distributed Computing*, 51(1):1-26, 1998. Note that Michael and Scott's algorithm and data structure implemented generally in accordance therewith provide us with useful context to describe our additional inventive concepts. Nothing herein should be taken as a suggestion that our techniques are derived from, linked with, or limited to the algorithm, data structures or any design choices embodied in or by Michael and Scott's work.

In Michael and Scott's algorithm (hereafter M&S), a queue is represented by a linked list, and nodes that have been dequeued are placed in a "freelist" implemented in the style of Treiber. In the description that follows, we refer to such freelists as "memory pools" in order to avoid confusion between "freeing" a node—by which we mean returning it to the memory allocator through the free library routine—and placing a node on a freelist. In this approach, rather than freeing nodes to the memory allocator when they are no longer required, we place them in a memory pool from which new nodes can be allocated later. An important disadvantage of this approach is that data structures implemented this way are not truly dynamic-sized: after they have grown large and subsequently shrunk, the memory pool contains many nodes that cannot be reused for other purposes, cannot be coalesced, etc.

Our two queue implementations achieve dynamic-sizing in different ways. Algorithm 1 eliminates the memory pool, invoking the standard malloc and free library routines to allocate and deallocate nodes of the queue. Algorithm 2 does use a memory pool, but unlike M&S, the nodes in the memory pool can be freed to the system. We present our algorithms in the context of a transformed version of the M&S algorithm (see below). This "generic code" invokes additional procedures that must be instantiated to achieve full implementations. We first provide exemplary instantiations consistent with the original M&S algorithm. Then, we provide instantiations for our new algorithms. In this way, we illustrate true dynamic-sizing in the context of a familiar lock-free data structure design that does not itself provide a true dynamic sizing capability.

Note that although the M&S design does allow nodes to be added and removed from the queue, such nodes are added from, and removed to, a memory pool. Since no mechanism is provided to remove nodes from the memory pool, the amount of storage allocated for use by the queue is monotonic, non-decreasing. Accordingly, it is not really correct to describe the M&S design as a dynamic-sized lock-free data structure. Our work achieves a true dynamic-sized lock-free queue.

Michael and Scott's Algorithm

In general, the M&S design will be understood in the context of the following slightly transformed version which plays the role of a "generic code" base for the modified versions that follow. The M&S design builds on a queue data structure that will be understood as follows:

```
struct pointer_t { node_t *ptr; int version; }
struct node_t { int value; pointer_t next; }
struct queue_t { pointer_t Head, Tail; }
queue_t *newQueue() {
    queue_t *Q = malloc(sizeof(queue_t));
    node_t *node = allocNode();
    node->next.ptr = null;
    Q->Head.ptr = Q->Tail.ptr = node;
    return Q;
}
bool Enqueue(queue_t *Q, int value) {
1    node_t *node = allocNode();
2    if (node == null)
3        return FALSE;
4    node->value = value;
5    node->next.ptr = null;
6    while (TRUE) {
7        pointer_t tail;
8        GuardedLoad(&Q->Tail, &tail, 0);
9        pointer_t next = tail.ptr->next;
10       if (tail == Q->Tail) {
11           if (next.ptr == null) {
12               if (CAS(&tail.ptr->next, next,
                     <node, next.version+1>))
13                   break;
14           } else
15               CAS(&Q->Tail, tail, <next.ptr, tail.version+1>)
         }
     }
16   CAS(&Q->Tail, tail, <node.tail, version+1>)
17   Unguard(0);
18   return TRUE;
}
bool Dequeue(queue_t *Q, int *pvalue) {
19   while (TRUE) {
20       pointer_t head;
21       GuardedLoad(&Q->Head, &head, 0);
22       pointer_t tail = Q->Tail;
23       pointer_t next;
24       GuardedLoad(&head.ptr->next, &next, 1);
25       if (head == Q->Head) {
26           if (head.ptr == tail.ptr) {
27               if (next.ptr == null) {
28                   Unguard(0);
29                   Unguard(1);
30                   return FALSE;
                 }
31               CAS(&Q->Tail, tail, <next.ptr, tail.version+1>)
32           } else {
33               *pvalue = next.ptr->value;
34               if (CAS(&Q->Head, head, <next.ptr,
                     head.version+1>))
35                   break;
             }
         }
     }
36   Unguard(0);
37   Unguard(1);
38   deallocNode(head.ptr);
39   return TRUE;
}
```

The preceding generic code invokes four additional procedures, shown in italics, which are not specified in the generic code. Three variations on the M&S design can be achieved using three different implementations of the additional procedure sets. For completeness, a first set results in an implementation that corresponds to the original M&S design. In short, we get the original M&S algorithm by instantiating the following procedures:

```
node_t *allocNode() {
1    if (memory pool is empty)
2        return malloc(sizeof(node_t));
3    else {
4        return node removed from memory pool;
     }
}
void deallocNode(node_t *n) {
5    add n to memory pool
}
void GuardedLoad(pointer_t *s, pointer_t *t, int h) {
6    *t = *s;
7    return;
}
void Unguard(int h) {
8    return;
}
```

The allocNode and deallocNode procedures use a memory pool. The allocnode procedure removes and returns a node from the memory pool if possible and calls malloc if the Pool is empty. The deallocNode procedure puts the node being deallocated into the memory pool. As stated above, nodes in the memory pool cannot be freed to the system. Michael and Scott do not specify how nodes are added to and removed from the memory pool. Because the M&S design does not use value recycling technique such as that provided by solutions to the ROP, it has no notion of "guards." As a result, GuardedLoad is an ordinary load and Unguard is a no-op.

We do not discuss M&S in detail. See M. Michael & M. Scott, *Nonblocking Algorithms and Preemption-Safe Locking on Multiprogrammed Shared Memory Multiprocessors*, Journal or Parallel and Distributed Computing, 51(1):1-26, 1998 for such details. Instead, we discuss below the aspects that are relevant for our purposes.

Although nodes in the M&S memory pool have been deallocated, they cannot be freed to the system because some thread may still intend to perform a CAS on the node. Various problems can arise from accesses to memory that has been freed. Thus, although it is not discussed at length by the authors, M&S' use of the memory pool is necessary for correctness. Because Enqueue may reuse nodes from the memory pool, M&S uses version numbers to avoid the ABA problem, in which a CAS succeeds even though the pointer it accesses has changed because the node pointed to was deallocated and then subsequently allocated. The version numbers are stored with each pointer and are atomically incremented each time the pointer is modified. This causes such "late" CAS's to fail, but it does not prevent them from being attempted.

The queue is represented by two node pointers: the Head, from which nodes are dequeued, and the Tail, where nodes are enqueued. The Head and Tail pointers are never null; the use of a "dummy" node ensures that the list always contains at least one node. When a node is deallocated, no path exists from either the Head or the Tail to that node. Furthermore, such a path cannot subsequently be established before the node is allocated again in an Enqueue operation. Therefore, if such a path exists, then the node is in the queue. Also, once a node is in the queue and its next field has become non-null, its next field cannot become null again until the memory that contains the node is subsequently reallocated, implying that the node has been freed before that time. These properties provide a basis to establish correctness of our dynamic-sized variants of the generic M&S design.

Algorithm 1—Direct Dynamic Sizing (No Memory Pool)

As mentioned earlier, Algorithm 1 eliminates the memory pool, and uses malloc and free directly for memory allocation. As discussed below, Algorithm 1 also eliminates the ABA problem, and thus, the need for version numbers. Significantly and unlike the original M&S design, this feature allows designs based on Algorithm 1 to be used on systems that support CAS only on pointer-sized values.

For ease of understanding we present variations for Algorithm 1 in the context of the above "generic code." Algorithm 1, with true dynamic sizing, is achieved by instantiating the following variations of the additional procedures for use by the generic code:

```
Node_t *allocNode() {
1    return malloc(sizeof(node_t));
}
void deallocNode(node_t *n) {
2    for each m ∈ Liberate({n})
3        free(m);
}
void GuardedLoad(pointer_t *s, pointer_t *t, int g) {
4    while (TRUE) {
5        *t = *s;
6        if (t->ptr == null)
7            return;
8        PostGuard(guards[p] [g], t->ptr);
9        if (*t == *s)
10           return;
     }
}
void Unguard(int g) {
11   PostGuard(guards[p] [g], null);
}
```

Persons of ordinary skill in the art will, of course, recognize that separation of Algorithm 1 into additional procedures and generic code is arbitrary and is employed purely for illustration. Corresponding, indeed even technically equivalent, implementations may be achieved without resorting to this artificial pedagogical separation.

As explained below, the preceding procedures employ value recycling techniques in accordance with a ROP formulation. We assume that before accessing the queue, each thread p has hired two guards and stored identifiers for these guards in guards[p][0] and guards[p][1]. The allocNode procedure simply invokes malloc. However, because some thread may have a pointer to a node being deallocated, deallocNode cannot simply invoke free. Instead, deallocNode passes the node being deallocated to Liberate and then frees any nodes returned by Liberate. The properties of ROP ensure that a node is never returned by an invocation of Liberate while some thread might still access that node.

The GuardedLoad procedure loads a value from the address specified by its first argument and stores the value loaded in the address specified by its second argument. The goal of this procedure is to ensure that the value loaded is guarded by the guard specified by the third argument before the value is loaded. This goal is accomplished by a lock-free loop that retries if the value loaded changes after the guard is posted (null values do not have to be guarded, as they will never be dereferenced). As explained below, GuardedLoad helps ensure that guards are posted soon enough to trap the pointers they guard, and therefore to prevent the pointers they guard from being freed prematurely. The Unguard procedure removes the specified guard.

Correctness Argument for Algorithm 1

Operation of Algorithm 1 corresponds to that of M&S, except for issues involving memory allocation and deallocation. To see this, observe that GuardedLoad implements an ordinary load, and Unguard does not affect any variables of the underlying M&S algorithm. Therefore, we need only argue that no instruction accesses a freed node. Because nodes are freed only after being returned by Liberate, it suffices to argue for each access to a node, that, at the time of the access, a pointer to the node has been continuously guarded since some point at which the node was in the queue (that is, a node is accessed only if it is trapped). As discussed earlier, if there is a path from either Head or Tail to a node, then the node is in the queue. As shown below, we can exploit code already included in M&S, together with the specialization code in FIG. 6, to detect the existence of such paths.

We first consider the access at line 9 of Enqueue. In this case, the pointer to the node being accessed was acquired from the call to GuardedLoad at line 8. Because the pointer is loaded directly from Tail in this case, the load in line 9 of the Algorithm 1 implementation of GuardedLoad serves to observe a path (of length one) from Tail to the accessed node. The argument is similarly straightforward for the access at line 12 of Enqueue and the access in GuardedLoad when invoked from line 24 (Dequeue).

The argument for the access at line 33 of Dequeue is not as simple. First, observe that the load at line 9 of GuardedLoad (in the call at line 24 of Dequeue) determines that there is a pointer from the node specified by Head.ptr to the node accessed at line 33. Then, the test at line 25 determines that there is a pointer from Head to the node specified by Head.ptr. If these two pointers existed simultaneously at some point between the guard being posted as a result of the call at line 24 and the access at line 33, then the required path existed. As argued above, the node pointed to by Head.ptr is guarded and was in the queue at some point since the guard was posted in the call to GuardedLoad at line 21, and this guard is not removed or reposted before the execution of line 33. Therefore, relying on the properties of ROP, this node cannot be freed and reallocated in this interval Also, in the M&S algorithm, a node that is dequeued does not become reachable from Head again before it has been reallocated by an Enqueue. Therefore, the load at line 25 confirmed that Head contained the same value continuously since the execution of line 21. This in turn implies that the two pointers existed simultaneously at the point at which the load in GuardedLoad invoked from line 24 was executed. The last part of this argument can be made much more easily by observing that the version number (discussed next) of Head did not change. However, we later observe that the version numbers can be eliminated from Algorithm 1, so we do not want to rely on them in our argument. This concludes our argument that Algorithm 1 never accesses freed memory.

Next, we show that the version numbers for the node pointers are unnecessary in our Algorithm 1. Apart from the overhead involved with managing these version numbers, the requirement that they are updated atomically with pointers renders algorithms that use them inapplicable in systems that support CAS only on pointer-sized values. Accordingly, the ability to eliminate version numbers is an important achievement in and of itself. In addition, since version numbers were "necessary" to avoid an ABA hazard, another useful exploitation of the invented techniques is now apparent, namely ABA hazard avoidance.

Eliminating Version Numbers in Algorithm 1

By inspecting the code for Algorithm 1, we can see that the only effect of the version numbers is to make some comparisons fail that would otherwise have succeeded. These comparisons are always between a shared variable V and a value previously read from V. The comparisons would fail anyway if V's pointer component had changed, and would succeed in any case if V had not been modified since the V was read. Therefore, version numbers change the algorithm's behavior only in the case that a thread p reads value A from V at time t, V subsequently changes to some other value B, and later still, at time t', V changes back to a value that contains the same pointer component as A, and p compares V to A. With version numbers, the comparison would fail, and without them it would succeed. We begin by establishing that version numbers do not affect the outcome of comparisons other than the one in line 9 of GuardedLoad. We deal with that case later.

We first consider cases in which A's pointer component is non-null. It can be shown for each shared pointer variable V in the algorithm that the node pointed to by A is freed and subsequently reallocated between times t and t' in this case. Furthermore, it can be shown that each of the comparisons mentioned above occurs only if a guard was posted on A before time t and is still posted when the subsequent comparison is performed, and that the value read from A was in the queue at some point since the guard was posted when the comparison is performed. Because ROP prohibits nodes from being returned by Liberate (and therefore from being freed) in this case, this implies that these comparisons never occur in Algorithm 1.

We next consider the case in which A's pointer component is null. The only comparison of a shared variable to a value with a null pointer is the comparison performed at line 12 of the Enqueue operation (because the Head and Tail never contain null and therefore neither do the values read from them). As argued earlier, the access at line 12 is performed only when the node being accessed is trapped. Also, as discussed earlier, the next field of a node in the queue does not become null again until the node is initialized by the next Enqueue operation to allocate that node. However, ROP ensures that the node is not returned from Liberate, and is therefore not subsequently freed and reallocated, before the guard is removed or reposted.

It remains to consider the comparison in line 9 of GuardedLoad, which can have a different outcome if version numbers are used than it would if they were not used. However, this does not affect the externally-observable behavior of the GuardedLoad procedure, and therefore does not affect correctness. The only property of the GuardedLoad procedure on which we have depended for our correctness argument is the following: GuardedLoad stores a value v in the location pointed to by its second argument such that v was in the location pointed to by GuardedLoad's first argument at some point during the execution of GuardedLoad and that a guard was posted on (the pointer component of) v before that time and has not subsequently been reposted or removed. It is easy to see that this property is guaranteed by the GuardedLoad procedure, with or without version numbers.

Algorithm 2—with Memory Pool

One drawback of Algorithm 1 is that every Enqueue and Dequeue operation involves a call to the malloc or free library routine (or other similar facility) introducing significant overhead. In addition, every Dequeue operation invokes Liberate, which is also likely to be expensive. Algorithm 2 overcomes these disadvantages by reintroducing the memory pool. However, unlike the M&S algorithm, nodes in the memory pool of Algorithm 2 can be freed to the system.

Algorithm 2 is achieved by instantiating the generic code (described above) with the same GuardedLoad and Unguard procedures used for Algorithm 1, though with modified allocNode and deallocNode procedures such as illustrated below:

```
    Pointer_t Pool;
    Node_t *allocNode() {
1       pointer_t oldPool, newPool;
2       while (TRUE) {
3           GuardedLoad(&Pool, &oldPool, 0);
4           if (oldPool.ptr == null) {
5               Unguard(0);
6               return malloc(sizeof(node_t));
            }
7           newPool = oldPool.ptr->next;
8           Unguard(0);
9           newPool.version = oldPool.version + 1;
10          if (CAS(&Pool, oldPool, newPool)) {
11              return oldPool.ptr;
            }
        }
    }
    void deallocNode(node_t *n) {
12      pointer_t oldPool, newPool;
13      while (TRUE) {
14          oldPool = Pool;
15          n->next.ptr = oldPool.ptr;
16          newPool.ptr = n;
17          newPool.version = oldPool.version + 1;
18          if (CAS(&Pool, oldPool, newPool))
19              return;
        }
    }
```

As in the original M&S algorithm, the allocNode and deallocNode procedures, respectively, remove nodes from and add nodes to the memory pool Unlike the original algorithm, however, the memory pool is implemented so that nodes can be freed. Thus, by augmenting Algorithm 2 with a policy that decides between freeing nodes and keeping them in the memory pool for subsequent use, a truly dynamic-sized implementation can be achieved.

The above procedures use a linked-list representation of a stack for a memory pool. This implementation extends Treiber's straightforward implementation by guarding nodes in the Pool before accessing them; this allows us to pass removed nodes to Liberate and to free them when returned from Liberate without the risk of a thread accessing a node after it has been freed. Our memory pool implementation is described in more detail below.

The node at the top of the stack is pointed to by a global variable Pool. We use the next field of each node to point to the next node in the stack. The deallocnode procedure uses a lock-free loop; each iteration uses CAS to attempt to add the node being deallocated onto the top of the stack. As in Treiber's implementation, a version number is incremented atomically with each modification of the Pool variable to avoid the ABA problem.

The allocNode procedure is more complicated. In order to remove a node from the top of the stack, allocNode determines the node that will become the new top of the stack. This is achieved by reading the next field of the node that is currently at the top of the stack. As before, we use a ROP-style value recycling solution to protect against the possibility of accessing (at line 7) a node that has been freed. Therefore, the node at the top of the stack is guarded and then confirmed by the GuardedLoad call at line 3. As in the easy cases discussed above for Algorithm 1, the confirmation of the pointer loaded by the call to GuardedLoad establishes that the pointer is trapped, because a node will not be passed to Liberate while it is still at the Head of the stack.

We have not specified when or how nodes are passed to Liberate. There are many possibilities and the appropriate choice depends on the application and system under consideration. Any of a variety of design choices are suitable. One possibility is for the deallocNode procedure to liberate nodes when the size of the memory pool exceeds some fixed limit. Alternatively, we could have an independent "helper" thread that periodically (or routinely) checks the memory pool and decides whether to liberate some nodes in order to reduce the size of the memory pool. Such decisions could be based on the size of the memory pool or on other criteria. In general, there is no need for the helper thread to grow the memory pool because this will occur naturally. When there are no nodes in the memory pool, allocNode invokes malloc to allocate space for a new node.

The Pass the Buck Algorithm

In this section, we describe one value recycling solution, the Pass The Buck (PTB) algorithm. As before, the PTB algorithm is presented using ROP terminology. An important goal when designing PTB was to minimize the performance penalty to the application when no values are being liberated. That is, the PostGuard operation should be implemented as efficiently as possible, perhaps at the cost of a more expensive Liberate operation. Such solutions are desirable for at least two reasons. First, PostGuard is invoked by the application, so its performance impacts application performance. On the other hand, Liberate work can be done by a spare processor, or by a background thread, so that it does not directly impact application performance. Second, solutions that optimize PostGuard performance are desirable for scenarios in which values are liberated infrequently, but we must retain the ability to liberate them. An example is the implementation of a dynamic-sized data structure that uses a memory pool to avoid allocating and freeing objects under "normal" circumstances but can free elements of the memory pool when it grows too large. In this case, no liberating is necessary while the size of the data structure is relatively stable. With these goals in mind, we describe our Pass The Buck algorithm below.

```
    struct {value val; int ver} HO_t
        // HO_t fits into CAS-able location
    constant MG: max. number of guards
    shared variable
        GUARDS: array[0..MG-1] of bool init false;
        MAXG: int init 0;
        POST: array[0..MG-1] of value init null;
        HNDOFF: array[0..MG-1] of HO_t init <null, 0>;
    int HireGuard() {
1       int i = 0, max;
2       while (!CAS (&GUARDS[i],false,true))
3           i++ ;
4       while ( (max = MAXG) < i)
5           CAS (&MAXG, max, i) ;
6       return i;
    }
    void FireGuard(int i) {
7       GUARDS [i] = false;
```

```
-continued 8    return;
}
void PostGuard (int i, value v) {
9    POST[i] = v;
10   return;
}
value set Liberate (value set vs) {
11   int i = 0;
12   while (i <= MAXG) {
13      int attempts = 0;
14      HO_t h = HNDOFF [i];
15      value v = POST [i];
16      if (v != null && vs->search (v)) {
17         while (true) {
18            if (CAS (&HNDOFF [i], h, <v, h.ver+1>)) {
19               vs->delete (v);
20               if (h.val != null) vs->insert(h.val);
21               break;
            }
22            attempts++;
23            if (attempts == 3) break;
24            h = HNDOFF[i];
25            if (attempts == 2 && h.val != null) break;
26            if (v != POST[i] ) break;
         }
27      } else {
28         if (h.val != null && h.val != v)
29            if (CAS (&HNDOFF [i], h, <null, h.ver+1>))
30               vs->insert(h.val);
      }
31      i++;
   }
32   return vs;
}
```

Throughout the algorithm, the pointers to blocks of memory being managed are called values. The GUARDS array is used to allocate guards to threads. Here we assume a bound MAXG on the number of guards simultaneously employed. However, as later explained, we can remove this restriction. The POST array includes one location per guard, which holds the pointer value the guard is currently assigned to guard if one exists, and NULL otherwise. The HNDOFF array is used by Liberate to "hand off" responsibility for a value to another Liberate operation if the value has been trapped by a guard.

The HireGuard and FireGuard procedures essentially implement long-lived renaming. Specifically, for each guard g, we maintain an entry GUARDS [g], which is initially false. Thread p hires guard g by atomically changing GUARDS [g] from false (unemployed) to true (employed); p attempts this with each guard in turn until it succeeds (lines 2 and 3). The FireGuard procedure simply sets the guard back to false (line 7). The HireGuard procedure also maintains the shared variable MAXG, which is used by the Liberate procedure to determine how many guards to consider. Liberate considers every guard for which a HireGuard operation has completed. Therefore, it suffices to have each HireGuard operation ensure that MAXG is at least the index of the guard returned. This is achieved with the simple loop at lines 4 and 5.

PostGuard is implemented as a single store of the value to be guarded in the specified guard's POST entry (line 9 ), in accordance with our goal of making PostGuard as efficient as possible.

Some of the most interesting parts of the PTB algorithm lie in the Liberate procedure. Recall that Liberate should return a set of values that have been passed to Liberate and have not since been returned by Liberate, subject to the constraint that Liberate cannot return a value that has been continuously guarded by the same guard since before the value was most recently passed to Liberate (i.e., Liberate must not return trapped values).

Liberate is passed a set of values, and it adds values to and removes values from its value set as described below before returning (i.e., liberating) the remaining values in the set. Because we want the Liberate operation to be wait-free, if some guard g is guarding a value v in the value set of some thread p executing Liberate, then p must either determine that g is not trapping v or remove v from p's value set before returning that set. To avoid losing values, any value that p removes from its set must be stored somewhere so that, when the value is no longer trapped, another Liberate operation may pick it up and return it. The interesting details of PTB concern how threads determine that a value is not trapped, and how they store values while keeping space overhead for stored values low. Below, we explain the Liberate procedure in more detail, paying particular attention to these issues.

The loop at lines 12 through 31 iterates over all guards ever hired. For each guard g, if p cannot determine for some value v in its set that v is not trapped by g, then p attempts to "hand v off to g." If p succeeds in doing so (line 18), it removes v from its set (line 19) and proceeds to the next guard (lines 21 and 31). If p repeatedly attempts and fails to hand v off to g, then, as we explain below, v cannot be trapped by g, so p can move on to the next guard. Also, as explained in more detail below, p might simultaneously pick up a value previously handed off to g by another Liberate operation, in which case this value can be shown not to be trapped by g, so p adds this value to its set (line 20). When p has examined all guards (see line 12), it can safely return any values remaining in its set (line 32).

We describe the processing of each guard in more detail below. First, however, we present a central property of a correctness proof of this algorithm, which will aid the presentation that follows; this lemma is quite easy to see from the code and the high-level description given thus far.

Single Location Lemma: For each value v that has been passed to some invocation of Liberate and not subsequently returned by any invocation of Liberate, either v is handed off to exactly one guard, or v is in the value set of exactly one Liberate operation (but not both). Also, any value handed off to a guard or in the value set of any Liberate operation has been passed to Liberate and not subsequently returned by Liberate.

The processing of each guard g proceeds as follows: At lines 15 and 16, p determines whether the value currently guarded by g (if any)—call it v—is in its set If so, p executes the loop at lines 17 through 26 in order to either determine that v is not trapped, or to remove v from its set. In order to avoid losing v in the latter case, p "hands v off to g" by storing v in HNDOFF [g]. In addition to the value, an entry in the HNDOFF array contains a version number, which, for reasons that will become clear later, is incremented with each modification of the entry. Because at most one value may be trapped by guard g at any time, a single location HNDOFF [g] for each guard g is sufficient. To see why, observe that if p needs to hand v off because it is guarded, then the value (if any)—call it w—previously stored in HNDOFF [g] is no longer guarded, so p can pick w up and add it to its set. Because p attempts to hand off v only if v is in p's set, the Single Location Lemma implies that v≠w.

The explanation above gives the basic idea of our algorithm, but it is simplified. There are various subtle race conditions that must be avoided. Below, we explain in more detail how the algorithm deals with these race conditions.

To hand v off to g, p uses a CAS operation to attempt to replace the value previously stored in HNDOFF [g] with v (line 18); this ensures that, upon success, p knows which value it replaced, so it can add that value to its set (line 20). We explain later why it is safe to do so. If the CAS fails due to a concurrent Liberate operation, then p rereads HNDOFF [g] (line 24) and loops around to retry the handoff. There are various conditions under which we break out of this loop and move on to the next guard. Note in particular that the loop completes after at most three CAS attempts; see lines 13, 22, and 23. Thus our algorithm is wait-free. We explain later why it is safe to stop trying to hand v off in each of these cases.

We first consider the case in which p exits the loop due to a successful CAS at line 18. In this case, as described earlier, p removes v from its set (line 19), adds the previous value in HNDOFF [g] to its set (line 20), and moves on to the next guard (lines 21 and 31). An important part of understanding our algorithm is to understand why it is safe to take the previous value—call it w—of HNDOFF [g] to the next guard. The reason is that we read POST [g] (line 15 or 26) between reading HNDOFF [g] (line 14 or line 24) and attempting the CAS at line 18. Because each modification to HNDOFF [g] increments its version number, it follows that w was in HNDOFF [g] when p read POST [g]. Also, recall that w≠v in this case. Therefore, when p read POST [g], w was not guarded by g Furthermore, because w remained in HNDOFF [g] from that moment until the CAS, w cannot become trapped in this interval. This is because a value can become trapped only if it has not been passed to Liberate since it was last allocated, and all values in the HNDOFF array have been passed to some invocation of Liberate and not yet returned by any invocation of Liberate(and have therefore not been freed and reallocated since being passed to Liberate).

It remains to consider how p can break out of the loop without performing a successful CAS. In each case, p can infer that v is not trapped by g, so it can give up on its attempt to hand v off. If p breaks out of the loop at line 26, then v is not trapped by g at that moment simply because it is not even guarded by g. The other two cases (lines 23 and 25) occur only after a certain number of times around the loop, implying a certain number of failed CAS operations.

Figure 4:
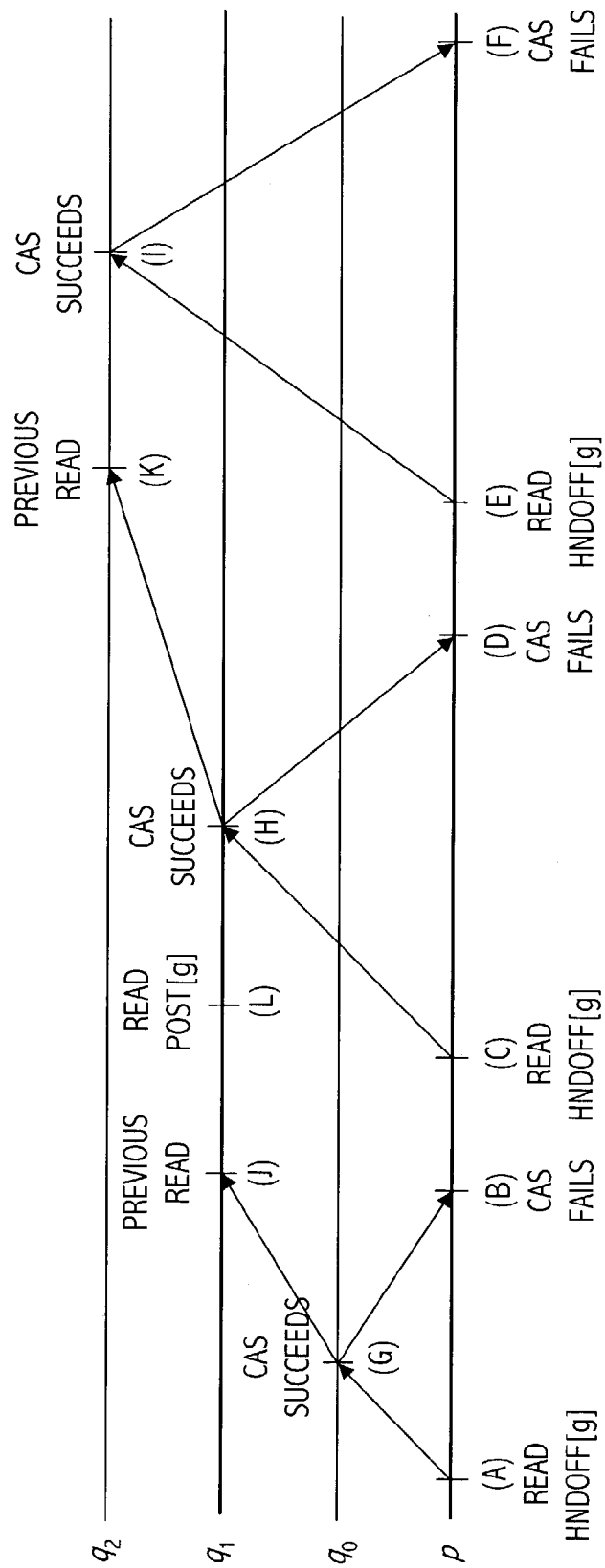
FIG. 4 is a timing diagram that illustrates interesting cases for an exemplary Pass The Buck (PTB) implementation of value recycling.

To see why we can infer that v is not trapped in each of these two cases, consider the timing diagram in FIG. 4. For the rest of this section, we use the notation $v_p$ to indicate the value of thread p's local variable v in order to distinguish between the local variables of different threads. In FIG. 4, we construct an execution in which p fails its CAS three times. The bottom line represents thread p:

at (A), p reads HNDOFF [g] for the first time (line 14);
at (B), p's CAS fails;
at (C), p rereads HNDOFF [g] at line 24; and
so on for (D), (E), and (F).

Because p's CAS at (B) fails, some other thread $q_0$ executing Liberate performed a successful CAS after (A) and before (B). We choose one and call it (G). The arrows between (A) and (G) and between (G) and (B) indicate that we know (G) comes after (A) and before (B). Similarly, some thread $q_1$ executes a successful CAS on HNDOFF [g] after (C) and before (D)—call it (H); and some thread $q_2$ executes a successful CAS on HNDOFF [g] after (E) and before (F)—call it (I). Threads $q_0$ through $q_2$ might not be distinct, but there is no loss of generality in treating them as if they were.

Now, consider the CAS at (H). Because every successful CAS increments the version number field of HNDOFF [g], $q_1$'s previous read of HNDOFF [g] (at line 14 or line 24)—call it (J)—must come after (G). Similarly, $q_2$'s previous read of HNDOFF [g] before (I)—call it (K)—must come after (H).

We consider two cases. First, suppose (H) is an execution of line 18 by $q_1$. In this case, between (J) and (H), $q_1$ read POST [g]=$v_{q1}$, either at line 15 or at line 26; call this read (L). By the Single Location Lemma, because $v_p$ is in p's set, the read at (L) implies that $v_p$ was not guarded by g at (L). Therefore, $v_p$ was not trapped by g at (L), which implies that it is safe for p to break out of the loop after (D) in this case (observe that attempts$_p$=2 in this case).

For the second case, suppose (H) is an execution of line 29 by thread $q_1$. In this case, because $q_1$ is storing null instead of a value in its own set, the above argument does not work. However, because p breaks out of the loop at line 25 only if it reads a non-null value from HNDOFF [g] at line 24, it follows that if p does so, then some successful CAS stored a non-null value to HNDOFF [g] at or after (H), and in this case the above argument can be applied to that CAS to show that $v_p$ was not trapped. If p reads null at line 24 after (D), then it continues through its next loop iteration.

In this case, there is a successful CAS (I) that comes after (H). Because (H) stored null in the current case, no subsequent execution of line 29 by any thread will succeed before the next successful execution of the CAS in line 18 by some thread. To see why, observe that the CAS at line 29 never succeeds while HNDOFF [g] contains null (see line 28). Therefore, for (I) to exist, there is a successful execution of the CAS at line 18 by some thread after (H) and at or before (I). Using this CAS, we can apply the same argument as before to conclude that $v_p$ was not trapped. It is easy to see that PTB is wait-free.

As described so far, p picks up a value from HNDOFF [g] only if its value set contains a value that is guarded by guard g. Therefore, without some additional mechanism, a value stored in HNDOFF [g] might never be picked up from there. To avoid this problem, even if p does not need to remove a value from its set, it still picks up the previously handed off value (if any) by replacing it with null (see lines 28 through 30). We know it is safe to pick up this value by the argument above that explains why it is safe to pick up the value stored in HNDOFF [g] in line 18. Thus, if a value v is handed off to guard g, then the first Liberate operation to begin processing guard g after v is not trapped by g will ensure that v is picked up and taken to the next guard (or returned from Liberate if g is the last guard), either by that Liberate operation or some concurrent Liberate operation.

Although various shared variables employed in the above exemplary realizations (e.g., GUARDS[ ], POST[ ] and HNDOFF[ ]) are implemented as arrays of predetermined size, it is relatively straightforward to relax this restriction should it be desirable to do so in certain implementations or environments. For example, we could replace the GUARDS array by a linked list of elements, each containing at least one guard location. Association of posting and hand off locations with a given guard would be by any suitable data structure. Instead of stepping through the GUARDS array to hire a guard, threads would now traverse the linked list; if a thread reaches the end of the list without successfully hiring a guard, it can allocate a new node, and use CAS to attempt to atomically append the new node to the list. If this CAS fails, the thread resumes traversing the list from that point.

Single-Word Lock-Free Reference Counting (SLFRC)

Earlier, we showed how to use value recycling techniques to add a dynamic-sizing capability to a non-blocking data structure, e.g., the Michael and Scott (M&S) lock-free queue algorithm. Although few changes to the algorithm were required, determining that the changes preserved correctness required careful reasoning and a detailed understanding of the original algorithm. In this section, we present single-word lock-free reference counting (SLFRC), a technique that allows us to transform, in a straight-forward manner, many lock-free data structure implementations that assume garbage collection (i.e., they never explicitly free memory) into dynamic-sized data structures. This technique enables a general methodology for, designing dynamic-sized data structures, in which we first design the data structure as if GC were available, and then we use SFLRC to make the implementation independent of GC. Because SLFRC is based on reference counts, it shares some of the disadvantages of reference counting techniques, including space and time overheads for maintaining reference counts and the need to deal with cyclic garbage; however, the straightforward nature of the transformations may allow wider adoption of techniques that facilitate dynamic-sized shared data structures in computational environments that do not provide or have access to garbage collection.

SLFRC is a variation on a lock-free reference counting (LFRC) technique detailed in U.S. patent application Ser. No. 09/837,671, filed Apr. 18, 2001, the entirety of which is incorporated herein by reference. In the above-incorporated patent application, transformations, supporting pointer manipulations (e.g., LFRCLoad, LFRCStore, LFRCCAS, LFRCCopy, LFRCDestroy, etc.), and resulting algorithms and data structures are all described in substantial detail. Based on the added description herein, persons of skill in the art will appreciate variations on the previously described techniques in which value recycling techniques described herein, including solutions organized around a Repeat Offender Problem (ROP) model and/or implementations based on the Pass The Buck (PTB) algorithm, facilitate particular LFRC variants in which a CAS operation (or other single-target synchronization construct) may be used, without dependence on more powerful, though generally less-available, multi-target synchronization constructs such as a DCAS operation. Accordingly, the particular LFRC variants described herein may allow more widespread adoption of the techniques previously described. In addition, when properly used, the particular LFRC variants described herein can prevent threads from accessing freed objects.

In view of the foregoing, we begin with an overview of LFRC, referring the reader to the above-incorporated U.S. patent application for greater detail, and highlight illustrative aspects of a particular CAS-based LFRC variant, such that persons of ordinary skill in the art will appreciate both the breadth of the previously described techniques and other variations that may be suitable in particular implementation environments.

Overview of LFRC

In general, the LFRC methodology provides a set of operations for manipulating pointers (e.g., in some realizations, LFRCLoad, LFRCStore, LFRCCAS, LFRCCopy, LFRCDestroy, etc.). These operations are used to maintain reference counts on objects (or more generally, on referenceable blocks of memory), so that they can be freed when no more references remain. The reference counts are not guaranteed to always be perfectly accurate because reference counts are sometimes incremented in anticipation of the future creation of a new reference. However, such creations might never occur, for example, because of a failed CAS. In such case, the LFRC operations decrement the reference count to compensate and transient overstatement of reference counts is of little consequence.

Most of the LFRC pointer operations act on objects to which the invoking thread knows a pointer exists and which the invoking thread can safely assume will not disappear before the end of the operation. For example, the LFRCCopy operation makes a copy of a pointer, and therefore increments the reference count of the object to which it points. In this case, the reference count can safely be accessed because we know that the first copy of the pointer has been included already in the reference count, and this copy will not be destroyed before the LFRCCopy operation completes.

The LFRCLoad operation, which loads a pointer from a shared variable into a private variable, is more interesting. Because this operation creates a new reference to the object to which the pointer points, we need to increment the reference count of this object. The problem is that the object might be freed after a thread p reads a pointer to it, and before p can increment its reference count. One LFRC solution to this problem is to use a DCAS operation to atomically confirm the existence of a pointer to the object while incrementing the object's reference count. This way, if the object had previously been freed, then the DCAS would fail to confirm the existence of a pointer to it, and would therefore not modify the reference count. Other synchronization constructs may be employed in other realizations.

From LFRC to SLFRC

The SLFRC techniques described herein extend the previously described techniques and contribute to at least two important advantages. First, SLFRC variations need not depend on DCAS or other multi target synchronization construct. Second, properly used, SLFRC variations do not allow threads to access freed objects. An exemplary SLFRC variant described herein provides the same functionality as some previously described implementations of LFRC, except that it does not support a LFRCDCAS operation. Furthermore, for the exemplary SLFRC variant, implementation of each SLFRC operation, except SLFRCLoad and SLFRCDestroy, can be implemented in the same manner as previously described for the LFRC counterpart. Accordingly, only implementations of the two variant operations are detailed below. As before, the reader is referred to the above-incorporated U.S. Patent Application for additional description.

An exemplary, ROP-based SLFRC variation of a destroy-oriented pointer operation may be implemented as follows, where a supporting add to reference count (add_to_rc) operation encapsulates certain commonly-employed functionality:

```
void SLFRCDestroy (Obj *ptr) {
1    if (ptr != null && add_to_rc (ptr, -1) == 1) {
2        // Recursively call SLFRCDestroy with each pointer in
            // the object pointed to by ptr.
3        for each v ∈ Liberate ( {ptr}) do
4            free (v);
     }
}
long add_to_rc (Obj *ptr, int v) {
5    long oldrc;
```

-continued

```
6   while (true) {
7       oldrc = ptr->rc;
8       if (CAS (&ptr->rc, oldrc, oldrc+v))
9           return oldrc;
    }
}
```

In general, SLFRC avoids use of a DCAS synchronization construct by instead employing a ROP-based solution to coordinate access to an object's reference count. Of course, other value recycling solutions may be employed in other realizations. To accommodate the ROP-based variation, the SLFRCDestroy operation is modified slightly from the previously-described DCAS-based LFRCDestroy implementation, though the correspondence of the implementations is instructive. The LFRCDestroy operation decrements the reference count of the object O pointed to by its argument and, if the reference count becomes zero as a result, recursively destroys each of the pointers in O, and finally frees O. The SLFRC version of this operation arranges for pointers to be passed to Liberate, rather than freeing them directly. When a pointer has been returned by Liberate, it can be freed. One way to achieve this, which is illustrated in the exemplary code above, is to have SLFRCDestroy invoke Liberate directly, passing as a parameter the singleton set containing the pointer to be freed, and to then free all pointers in the set returned by Liberate. Various alternatives are also possible. For example, a thread might "buffer" pointers to be passed together to Liberate later, either by that thread, or by some other thread whose sole purpose is executing Liberate operations. The latter approach allows us greater flexibility in scheduling when and where this work is done, which is useful for avoiding inconvenient pauses to application code.

Turning to the LFRCLoad operation, an exemplary, ROP-based SLFRC variation of a load-oriented pointer operation may be implemented as follows:

```
    void SLFRCLoad (Obj **A, Obj **dest) {
10      Obj *a, *olddest = *dest;
11      long r;
12      while (true) {
13          a = *A;
14          if (a == null) break;
15          PostGuard (g_p, a);
16          if (a == *A)
17              while ((r = a->rc) > 0)
18                  if (CAS (&a->rc, r, r+1))
19                      goto 20;
        }
20      if (a != null)
21          PostGuard (g_p, null);
22      *dest = a;
23      SLFRCDestroy (olddest);
    }
```

In the loop at lines 12 to 19, SLFRCLoad attempts to load a pointer value from the location specified by the argument A (line 13), and to increment the reference count of the object to which it points (line 18). To ensure that the object is not freed before the reference count is accessed, we employ a ROP-based solution (e.g., a PTB or other implementation) to the value recycling problem. Of course, other value recycling solutions may be employed in other realizations. Referring again to the illustrated SLFRCLoad implementation above, at line 15, we post a guard on the value read previously. The posting does not itself prevent the object from being freed before its reference count is accessed. Instead, we ensure that the object being guarded has a nonzero reference count after the guard has been posted. In the illustrated implementation, this goal is achieved by rereading the location (line 16). If the value no longer exists in this location, then SLFRCLoad retries. In general, retrying does not compromise lock-freedom because some other thread successfully completes a pointer store for each time around the loop. If the pointer is still (or again) in the location, then the object has not been passed to Liberate since it was last allocated (because objects are passed to Liberate only after their reference counts become zero, which happens only after all pointers to them have been destroyed).

If the value read at line 13 is null, then there is no reference count to update, so there is no need to post a guard (see line 14). Otherwise, because of the guarantees of ROP, it is safe to access the reference count of the object pointed to by the loaded value for as long as the guard remains posted. In the illustrated implementation, this goal is achieved by a simple lock-free loop (lines 17 to 19) in which we repeatedly read the reference count and employ a CAS operation to attempt to increment it. Other synchronization constructs may be employed in other realizations. Upon success, SLFRCLoad simply removes the guard, if any (lines 20 and 21), arranges for the return of the pointer read (line 22), and destroys the previous contents of the destination variable (see lines 10 and 23).

Observe that we increment the reference count of an object only if it is nonzero (line 17); if the reference count becomes zero, we retry the outer loop to get a new pointer. The reason for this is that if the reference count is zero, some thread has already begun recursively destroying outgoing pointers from the object in SLFRCDestroy, so it is too late to "resurrect" the object.

In general, we can apply the above-described SLFRC techniques and pointer operations to various algorithms, such as the Michael and Scott (M&S) queue algorithm detailed above, to achieve a dynamic-sized version of the algorithm. However, because of the overhead associated with reference counting, the performance of the resulting implementation would likely be worse than the implementations we presented earlier, which were achieved by applying our mechanisms directly, rather than through SLFRC. Nonetheless, it is noteworthy that dynamic-sizable shared data structures and related algorithms, including non-blocking, lock-free or wait-free implementations of dynamic-sizable shared data structures such as described and/or claimed elsewhere herein may be achieved either directly or using SLFRC techniques. In general, a direct or SLFRC-based approach is a matter of design choice and computational efficiency and/or simplicity of design and correctness proofs will tend to suggest a particular choice.

Other Embodiments

While the invention is described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. Other synchronization constructs or primitives may be employed. For example, while many implementations have been described in the context of compare-and-swap (CAS) operations, based on that description, persons of ordinary skill in the art will appreciate suitable modifications to employ alternative constructs such as a load-linked, store-conditional (LL/SC) operation pair or transactional sequence or facilities of transactional memory, should such alternative constructs be available or desirable in another implementation or environment.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of supporting dynamic-sizing for a shared data structure, the method comprising:
   providing the shared data structure, wherein the shared data structure is dynamically-sizable, and wherein the shared data structure includes separately reclaimable blocks of storage sharable, at least in part, by a plurality of threads of a multithreaded computation;
   in one of the plurality of threads of the multithreaded computation, successfully posting a guard on a value that encodes a pointer read from the shared data structure;
   in response to said successfully posting, dereferencing the pointer;
   freeing storage referenced by the value, wherein said freeing comprises:
      determining that storage referenced by the pointer is not in the shared data structure;
      determining that no guard successfully posted on the value remains successfully posted on the value; and
      in response to determining that storage referenced by the pointer is not in the shared data structure and no guard successfully posted on the value remains successfully posted on the value, qualifying the storage referenced by the value for deallocation.

2. The method of claim 1, wherein the posting is successful if, after the posting, the storage referenced thereby remains in the shared data structure.

3. The method of claim 1, further comprising:
   in a second thread of the multithreaded computation, dereferencing a second pointer read from the shared data structure after successfully posting a guard on a second value that encodes the second pointer.

4. The method of claim 3, wherein the value and the second value encode a same pointer.

5. The method of claim 1, further comprising:
   canceling the guard posted by the thread.

6. The method of claim 1, wherein the freeing is performed based on a storage pool management policy.

7. The method of claim 1, further comprising:
   qualifying for deallocation, storage referenced by a set of values, including the value.

8. The method of claim 1, wherein the dereferencing and the freeing are performed by different threads of the plurality of threads of the multithreaded computation.

9. The method of claim 1, wherein the dereferencing and the freeing are performed by a same thread of the plurality of threads of the multithreaded computation.

10. The method of claim 1, further comprising:
    dynamically allocating new storage; and
    including in the shared data structure, a pointer encoded by a value that references the new storage.

11. The method of claim 1, wherein the shared data structure includes a collection of elements traversable, at least in part, by respective pointers; and wherein the value upon which the guard is posted encodes one of the pointers.

12. The method of claim 11, wherein the collection of elements is organized, at least in part, as a list; and wherein the respective pointers include next pointers amongst elements of the list.

13. The method of claim 1, wherein the shared data structure implements a queue, stack, buffer, tree or list.

14. The method of claim 1, embodied, at least in part as:
    a first instruction sequence that performs the guard posting and supplies the pointer for dereferencing use after success thereof.

15. The method of claim 14, wherein the first instruction sequence is embodied as a guarded load routine.

16. The method of claim 1, further comprising:
    returning to an operating system, the deallocation qualified storage referenced by the value.

17. A computer program product encoded in one or more computer readable storage media and including a dynamically-sizable implementation of a data structure, comprising:
    a representation of the dynamically-sizable data structure instantiable as separately reclaimable blocks of storage sharable, at least in part, by plural threads of a multithreaded computation;
    a first instruction sequence executable by one or more of the threads to:
       access the data structure;
       successfully post a guard on a value that encodes a pointer, wherein the value references storage in the data structure, wherein said successfully posting comprises:
          determining that storage referenced by the pointer remains in the data structure; and
          in response to determining that storage referenced by the pointer remains in the data structure, posting a guard on the value that encodes the pointer; and
       dereference the pointer in response to said successful posting;
    a second instruction sequence executable by one or more of the threads to qualify for deallocation, a respective one of the storage blocks referenced by the value; and a third instruction sequence executable by one or more of the threads to return storage referenced by the deallocation qualified value.

18. The computer program product of claim 17, wherein the second instruction sequence is executable by the one or more threads to further qualify for deallocation respective additional ones of the storage blocks referenced by a set of values, the set including the value.

19. The computer program product of claim 17, embodied as a part of a memory allocator.

20. The computer program product of claim 17, embodied, at least in part, as a garbage collection facility.

21. The computer program product of claim 17, wherein the one or more computer readable storage media are selected from the set of: disk, tape or other magnetic, optical or electronic storage medium.

22. The computer program product of claim 17, wherein the second instruction sequence is further executable to:
   determine that storage referenced by the pointer is not in the shared data structure; and
   determine that no guard successfully posted on the value remains successfully posted on the value.

23. The computer program product of claim 17, where:
   the third instruction sequence is executable by one or more of the threads to return deallocation qualified storage to an operating system.

24. The computer program product of claim 17, further comprising:
   a fourth instruction sequence executable by on or more of the threads to return deallocation qualified storage to a storage pool associated with the data structure.

25. The computer program product of claim 24, wherein particular storage is freed from the storage pool.

26. A computer program product encoded in one or more computer readable storage media and comprising:
   an instruction sequence that includes one or more instructions, wherein the one or more instructions are configured to:
      provide a dynamically-sizable shared data structure, wherein the shared data structure includes separately reclaimable blocks of storage sharable, at least in part, by a plurality of threads of a multithreaded computation;
      in one of the plurality of threads of the multithreaded computation, successfully post a guard on a value that encodes a pointer read from the shared data structure;
      in response to said successfully posting, dereference the pointer;
      free storage referenced by the value, wherein said freeing comprises:
         determining that storage referenced by the pointer is not in the shared data structure;
         determining that no guard successfully posted on the value remains successfully posted on the value; and
         in response to determining that storage referenced by the pointer is not in the shared data structure and no guard successfully posted on the value remains successfully posted on the value, Qualify the storage referenced by the value for deallocation.

27. The computer program product of claim 26, further comprising:
   an instantiable representation of the data structure.

28. The computer program product of claim 26, further comprising:
   a second instruction sequence that frees storage referenced by the value after determining that the storage is not in the data structure and that no guard successfully posted on a value that encodes the pointer remains uncancelled.

29. An apparatus for supporting dynamic-sizing of a shared data structure, the apparatus comprising:
   means for representing the shared data structure as separately reclaimable blocks of storage sharable, at least in part, by a plurality of threads of a multithreaded computation;
   means for, in one of the plurality of threads of the multithreaded computation, successfully posting a guard on a value that encodes a pointer read from the shared data structure;
   means for, in response to said successfully posting, dereferencing the pointer;
   means for freeing storage referenced by the value, wherein said freeing comprises:
      determining that storage referenced by the pointer is not in the shared data structure;
      determining that no guard successfully posted on the value remains successfully posted on the value; and
      qualifying for deallocation, the storage referenced by the value.

* * * * *